United States Patent
Dean et al.

(10) Patent No.: US 12,493,308 B2
(45) Date of Patent: Dec. 9, 2025

(54) MEDIA HANDLING SYSTEM AND RELATED METHOD

(71) Applicant: GLOBAL MET TECH PTY LTD, Port Kennedy (AU)

(72) Inventors: Graeme Dean, Port Kennedy (AU); Simon Bailey, Port Kennedy (AU); Glyn Jones, Cornwall (GB); Ben Amos-Reed, Cornwall (GB)

(73) Assignee: GLOBAL MET TECH PTY LTD, Port Kennedy (AU)

( * ) Notice: Subject to any disclaimer, the term of this patent is extended or adjusted under 35 U.S.C. 154(b) by 43 days.

(21) Appl. No.: 18/688,338

(22) PCT Filed: Aug. 30, 2022

(86) PCT No.: PCT/AU2022/051061
§ 371 (c)(1),
(2) Date: Feb. 29, 2024

(87) PCT Pub. No.: WO2023/028648
PCT Pub. Date: Mar. 9, 2023

(65) Prior Publication Data
US 2024/0361786 A1    Oct. 31, 2024

(30) Foreign Application Priority Data
Aug. 30, 2021    (AU) ................. 2021902816

(51) Int. Cl.
*G05D 11/13*    (2006.01)
*B02C 17/18*    (2006.01)
(Continued)

(52) U.S. Cl.
CPC .......... *G05D 11/132* (2013.01); *B02C 17/186* (2013.01); *B02C 17/20* (2013.01);
(Continued)

(58) Field of Classification Search
CPC .... G05D 11/02; G05D 11/132; G05D 7/0676; G05D 7/0635; G05D 16/028;
(Continued)

(56) References Cited

U.S. PATENT DOCUMENTS 2,920,635 A * 1/1960 Wilson ................. B01J 3/02
137/15.04
3,252,618 A * 5/1966 Anderson ............ G05D 11/132
222/1

(Continued)

FOREIGN PATENT DOCUMENTS

| CN | 110510413 | 11/2019 |
|---|---|---|
| WO | 2011072324 | 6/2011 |
| WO | 2020044322 | 3/2020 |

OTHER PUBLICATIONS

International Search Report and Written Opinion of International Application No. PCT/AU2022/051061, Dec. 15, 2022, 12 pages.
(Continued)

*Primary Examiner* — William M McCalister
(74) *Attorney, Agent, or Firm* — Heslin Rothenberg Farley & Mesiti P.C.; Jacquelyn A. Graff, Esq.

(57) ABSTRACT

One embodiment of a media handling system (5) is disclosed for mixing and or entraining grinding media (15) with a liquid media (10) for supply to a selected destination (D). In one form, the system (5) comprises a first media transfer module (30) configured operable for providing a flow of liquid media (10) having a respective flow condition to a first inlet (11) by way of which liquid media is receivable by the system (5). The system (5) comprises a second media transfer module (25) arranged in fluid communication with and downstream of both of the first inlet (11) and a second inlet (16) by way of which grinding media (15) is receivable by the system (5). The second media transfer module (25) is configured operable for supplying to the selected destination
(Continued)

(D) a mixed flow of liquid and grinding media having a respective flow condition. In operation, one or both of the first (30) and second media transfer modules (25) are configured operable relative to the other for modifying one or both of the respective flow conditions so as to be operable or cooperable for facilitating a drawing or urging of a flow of the grinding media (15) into the system (5) via the second inlet (16) for controllably modifying a concentration of grinding media in the mixed flow of liquid and grinding media so as to converge toward and or substantially maintain a target concentration of grinding media (15) determined to be suitable for enabling supply of the mixed flow to the selected destination (D) by the second media transfer module (25).

23 Claims, 15 Drawing Sheets

(51) Int. Cl.
| | |
|---|---|
| *B02C 17/20* | (2006.01) |
| *B02C 23/00* | (2006.01) |
| *B02C 23/18* | (2006.01) |
| *B02C 25/00* | (2006.01) |
| *B65G 53/30* | (2006.01) |
| *B65G 53/58* | (2006.01) |
| *B65G 53/66* | (2006.01) |
| *G05D 7/06* | (2006.01) |
| *G05D 11/02* | (2006.01) |
| *G05D 16/00* | (2006.01) |
| *G05D 16/18* | (2006.01) |

(52) U.S. Cl.
CPC ............ *B02C 17/205* (2013.01); *B02C 23/00* (2013.01); *B02C 23/18* (2013.01); *B65G 53/30* (2013.01); *B65G 53/58* (2013.01); *B65G 53/66* (2013.01); *G05D 7/0676* (2013.01); *B02C 17/1805* (2013.01); *B02C 25/00* (2013.01); *G05D 7/0635* (2013.01); *G05D 11/02* (2013.01); *G05D 16/028* (2019.01); *G05D 16/187* (2019.01)

(58) Field of Classification Search
CPC .. G05D 16/187; B02C 17/20; B02C 17/1805; B02C 17/186; B02C 17/205; B02C 25/00; B02C 23/00; B02C 23/18; B65G 53/30; B65G 53/58; B65G 53/66
See application file for complete search history.

(56) References Cited

U.S. PATENT DOCUMENTS

| | | | | |
|---|---|---|---|---|
| 4,357,953 | A * | 11/1982 | Patterson | B01F 23/59 137/111 |
| 4,444,277 | A * | 4/1984 | Lewis | E21B 21/062 175/66 |
| 6,901,945 | B2 * | 6/2005 | Adams | B01F 21/221 137/268 |
| 2013/0292407 | A1 * | 11/2013 | Beavis | F04B 13/00 222/23 |
| 2021/0094039 | A1 | 4/2021 | Campos Orsi | |

OTHER PUBLICATIONS

International Preliminary Report on Patentability for International Application No. PCT/AU2022/051061, Nov. 29, 2023, 39 pages.

* cited by examiner

A - Grinding Media Inlet Pressure Differential
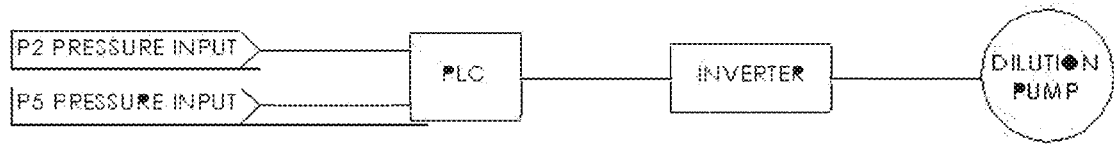
B - Bilateral Control of Delivery and Dilution Pump
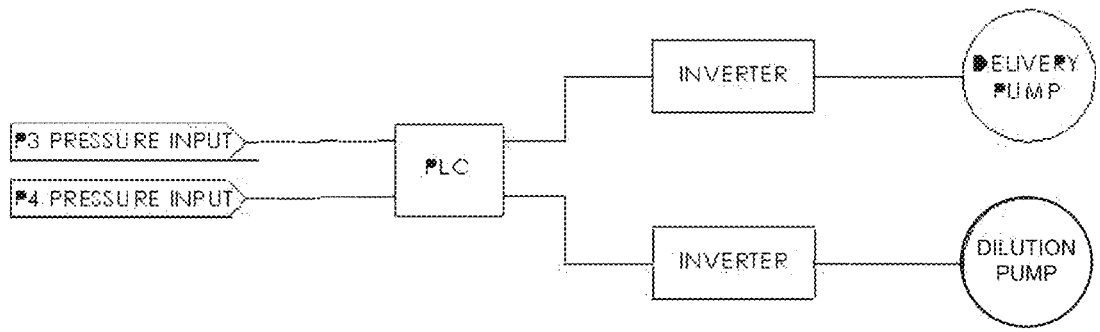
C - Density Control/Regulation
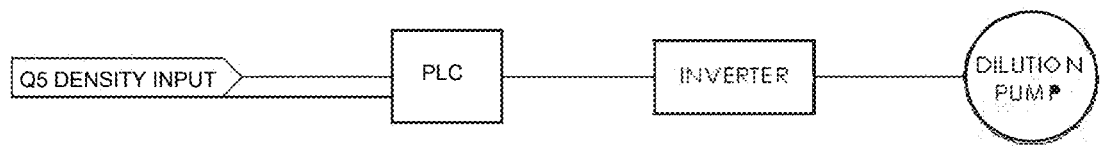
FIG. 4

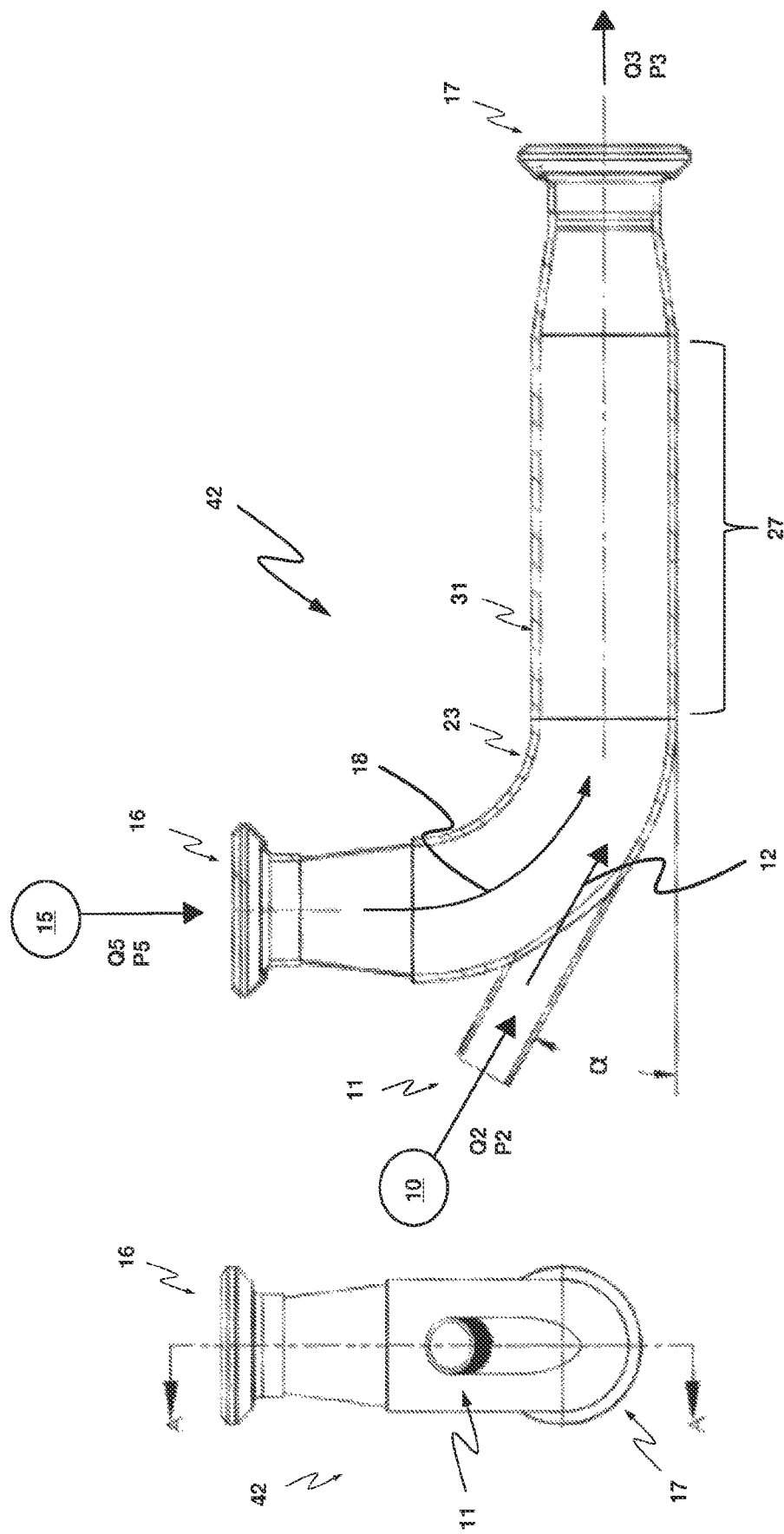

MEDIA HANDLING SYSTEM AND RELATED METHOD

CROSS REFERENCE TO RELATED APPLICATIONS

This application is a national stage filing under section 371 of International Application No. PCT/AU2022/051061, filed Aug. 30, 2022, and published on Mar. 9, 2023, as WO 2023/028648, which claims priority to Australian Patent Application No. 2021902816 filed on Aug. 30, 2021. The entire contents of each application are incorporated herein by reference in their entireties.

FIELD OF THE INVENTION

A media handling system and related method for mixing/entraining grinding media with a liquid media for delivery/supply to/from grinding mill equipment is disclosed.

RELATED APPLICATION

The present application claims priority to Australian provisional patent application No. 2021902816, the content of which is incorporated herein by reference in its entirety.

BACKGROUND

Grinding mills of various types exist and are used within the mining and processing industries. Despite their use to date no sufficiently reliable or efficient means of handling various forms of grinding media within such industries has been established that offers entirely satisfactory performance. Existing apparatus/methods have been found to be generally time consuming to use/operate, often requiring high levels of human intervention, media wastage, and can present unnecessary exposure to risk.

For example, some existing arrangements use augers or screw conveyors to transfer grinding media from a hopper to a grinding mill. Pneumatic and hydraulic conveying arrangements have been attempted for the same purpose but can struggle with the abrasive nature of some forms of grinding media often requiring repeated (costly) maintenance down time due to the usually short operational life span of the conveying systems. Examples of existing technologies in this niche area of technology are described in international patent publication (of the Patent Cooperation Treaty) WO2011/072324 (WO'324) and United States patent publication US 2021/0094039 (US'039). Both technologies described are highly mechanical in nature (the use of separate jet eductor and auger/screw feeders for grinding media injection) which can lead to various disadvantages/inefficiencies such as, for example, increased risk of damage/breakage to some forms of grinding media (which can consequentially reduce grinding performance/efficiency) and undue wear/damage to delivery pump/pipeline/conduit equipment (eg. pump choking events) which can consequentially reduce the service lifetime of key components in the delivery/transfer system. Furthermore, both described technologies require significant modification (incurring increases in cost and productivity downtime) in order to implement necessary reconfigurations needed to address/remedy any of the aforementioned disadvantages/inefficiencies for improved and/or optimised performance for delivery/supply of grinding media to an intended delivery destination. Thus, none of these types of arrangements have demonstrated entirely satisfactory performance across a range of delivery applications without requiring substantive modification.

It is therefore against this general background that the embodiments described herein have been developed.

SUMMARY

According to a first aspect, there is provided a media handling system for mixing/entraining grinding media with a liquid media for supply to a selected destination, the media handling system comprising:
  a first media transfer means or module configured operable for providing a flow of liquid media having a respective flow condition to a first inlet by way of which liquid media is receivable by the media handling system,
  a second media transfer means or module arranged in fluid communication with and downstream of both of the first inlet and a second inlet by way of which grinding media is receivable by the media handling system, and configured operable for supplying a mixed flow of liquid and grinding media having a respective flow condition,
  wherein one or both of the first and second media transfer means/modules are configured operable so as to modify one or both of the respective flow conditions so as to be operable or cooperable for controllably modifying a concentration of grinding media in the mixed flow of liquid and grinding media supplied by the second transfer media module.

According to a second aspect, there is provided a media handling system for mixing and or entraining grinding media with a liquid media for supply to a selected destination, the media handling system comprising:
  a first media transfer means or module configured operable for providing a flow of liquid media having a respective flow condition to a first inlet by way of which liquid media is receivable by the media handling system,
  a second media transfer means or module arranged in fluid communication with and downstream of both of the first inlet and a second inlet by way of which grinding media is receivable by the media handling system, and configured operable for supplying to the selected destination a mixed flow of liquid and grinding media having a respective flow condition,
  wherein one or both of the first and second media transfer means or modules are configured operable relative to the other for modifying one or both of the respective flow conditions so as to be operable or cooperable for facilitating a drawing or urging of a flow of the grinding media into the media handling system via the second inlet for controllably modifying a concentration of grinding media in the mixed flow of liquid and grinding media so as to converge toward and or substantially maintain a target concentration of grinding media determined to be suitable for enabling supply of the mixed flow of liquid and grinding media to the selected destination by the second media transfer means or module.

According to a third aspect, there is provided a media handling system for mixing and or entraining grinding media with a liquid media for supply to a selected destination, the media handling system comprising:
  a first media transfer means or module configured operable for providing a flow of liquid media having a respective flow condition to a first inlet by way of which liquid media is receivable by the media handling system, a second media transfer means or module arranged in fluid communication with and downstream of both of the first inlet and a second inlet by way of which grinding media is receivable by the media handling system, and configured operable for supplying to the selected destination a mixed flow of liquid and grinding media having a respective flow condition, wherein one or both of the first and second media transfer means or modules are configured operable having regard to, or in relation to, the operation of the other for modifying one or both of the respective flow conditions so as to be operable or cooperable for facilitating a drawing or urging of a flow of the grinding media into the media handling system via the second inlet for controllably modifying a concentration of grinding media in the mixed flow of liquid and grinding media so as to converge toward and or substantially maintain a target concentration of grinding media determined to be suitable for enabling the generation and or maintenance of a flow velocity of the mixed flow determined to be required to overcome a head characteristic of the media handling system imposed by the selected destination for enabling supply of the mixed flow by the second media transfer means or module.

Embodiments of the above-described aspects, and those described below, may comprise, either individually or in combination, any of the following features. It will be appreciated that various operable features may be enabled as steps, actions, or events as part of other aspects of the principles described herein that provide methods for mixing/entraining grinding media with a liquid media.

Embodiments of the media handling may be exemplified in the form of a closed fluid circuit or flow pathway operating to receive respective streams or flows of liquid media and grinding media (generally as a fluidised stream or flow) which undergo appropriate mixing/entrainment within the circuit/pathway as determined for onward supply/transfer to an intended (selected) delivery destination at a downstream end of the circuit/pathway. Accordingly, embodiments of the media handling system may be provided in the form of a mill charge transfer system configured operable for the transportation or conveyance of the grinding media to a delivery destination through a pipeline or conduit assembly using the liquid media as a transport or conveying agent, such as, for example, liquid water (which could be clean or reused process or service water) or a suitable slurry. Such a conveying technique is sometimes referred to as hydro-transportation. The skilled reader will appreciate that other forms of liquid fluids could be used for such conveying/transportation methods/techniques such as, for example, aqueous mineral suspensions such as those commonly processed in mineral processing plants.

The grinding media is of a solid particulate form (for example, in one form, a ceramic particulate solid) for use in performing a grinding action/function in a grinding mill (for example, a vertically aligned/orientated grinding mill of a tower form). A flow or stream of grinding media may be received vertically through the second inlet in the direction of gravity. A head of water or other liquid fluid may accompany the grinding media thereby providing a saturated or fluidised solution or slurry for assisting with hydro-transport of the grinding media. The head of water (or other fluid) serves to prevent air from being introduced/drawn or sucked into the fluid circuit or pathway of the media handling system. One example of grinding media used in accordance with the principles described herein comprises a ceramic solid particulate having a specific density of about 4.1. Other forms of grinding media used industrially comprise a specific density from about 2.8 to about 6.1.

The delivery destination may be at or near (or associated with) an inlet region to a grinding mill into which grinding media is to be placed for operational purposes, or at or near a storage or holding vessel into which grinding media is to be delivered, supplied, or placed following removal/draining from a grinding mill.

The second media transfer module may be arrangeable in fluid communication with one or more flow pathways (eg. pipe/conduit sections) or fluid circuits that fluidly connect the second media transfer module with the selected or intended objective delivery destination, and which may be elevated above the reception of respective flows of the liquid media and or the grinding media at the respective first, second inlets. For example, embodiments of the media handling system have been tested in which the delivery destination has been elevated up to about 24 m above the first, second inlets. Higher elevations could be possible by selecting appropriate media transfer modules capable of higher transfer capacities and managed/operated in accordance with the principles described herein. Practically, elevations of the delivery destination are driven by the industrial application to hand (and the usual equipment used in industry).

Mixing or entrainment of the liquid media and the grinding media occurs generally downstream of the first media transfer means/module (hereinafter, the first media transfer module) and generally upstream of the second media transfer means/module (hereinafter, the second media transfer module).

The first media transfer module may comprise any one of the following: a pressure pump, a centrifugal pump, a peristaltic pump, a progressive cavity pump, a rotary lobe pump, a diaphragm pump, a piston pump, a screw pump, and the second media transfer module may comprise any one of the following: a vortex pump, a centrifugal pump, a peristaltic pump.

In one form, the first media transfer module is configured operable so that the flow condition it generates enables a fixed, known or predetermined flow rate (volumetric or mass flow rate) of the liquid media to be provided to the first inlet, which may be regardless of any pressure downstream of the first inlet, and the second media transfer module is configured so that the flow condition it generates provides a flow of the mixed liquid and grinding media at a desired or determined flow rate (volumetric or mass flow rate or flow velocity).

The first and second media transfer modules may be configured operable or cooperable for facilitating a drawing or urging of a flow of the grinding media having a respective flow condition into/through the second inlet.

In one embodiment, the first media transfer module may be configured operable so that the respective flow condition it generates for introducing the flow of liquid media to the first inlet is insufficient to meet the flow requirements or demands of the second media transfer module for its desired operation thereby facilitating, at least in part, a drawing or urging of a flow or stream of the grinding media having a respective flow condition into/through the second inlet for engagement with the flow of the liquid media for mixing/entrainment purposes.

In another embodiment, the first media transfer module may be configured operable so that the respective flow condition it generates for introducing the flow of liquid media to the first inlet is insufficient to meet the flow requirements or demands required of the second media transfer module for operating at a target level of operation determined to be suitable for supplying the mixed flow to the selected destination thereby facilitating, at least in part, the drawing or urging of a flow of the grinding media having a respective flow condition into or through the second inlet for engagement with the flow of the liquid media for mixing and or entrainment purposes.

The term "flow condition" as used herein refers to the state of a flow of media having regard to a number of attributes or features (hereinafter, attributes) that the relevant flow of media comprises. Such attributes can be varied or modified by way of the operation of one or both of the first, second media transfer modules so as to modify the relevant flow condition they generate. Operation of one or both first, second media transfer modules may comprise varying or modifying a respective operational condition or state (eg. increasing or decreasing their respective running speeds so as to modify the respective flow rates they produce) of the relevant media transfer module so as to modify one or both respective flow conditions. This in turn influences the flow condition of the flow of grinding media into the second inlet. In this manner, various of the attributes of the respective flow conditions in the system can be modified as needed in order to control the concentration of grinding media in the mixed flow of liquid and grinding media so as to facilitate hydro-transport.

Broadly, the principles described herein enable the capability of controllably modifying the concentration of the grinding media during a mixing/entrainment process for hydro-transport purposes by way of managing operation of one or both of the first, second media transfer modules for modifying the flow conditions they generate or have an influence on. When delivering/supplying the entrained flow of liquid and grinding media to a distal and/or elevated delivery destination various attributes of the various flow conditions inform how the flow conditions are to be modified by way of the respective first, second media transfer modules (eg. changes to their respective operational states, ie. increasing or decreasing running speeds so as to modify the respective flow rates they produce) in order to facilitate effective hydro-transport of the grinding media. Controlled modification of the concentration of grinding media enables a desired or target density (being a measure of mass per volume) or specific gravity (being a measure of a mixture's density relative to that of water) of the entrained media to be converged toward, and be maintained as needed, for effective delivery/supply of the entrained media given the determined delivery circumstances, such as system delivery head and friction loss characteristics inherent (as they may each be determined) in the desired or intended delivery system/ network. The skilled reader will appreciate that the range of the duty system head characteristic (or system head pressure) is a function of the length of the pipeline including relevant fluid velocity, pipeline geometry (for example, pipe bends and similar geometrical disruptions in the pipeline network), density of the mixed flow of liquid media and grinding media (which drives the friction head loss component created as a result of media rubbing against the internal wall of the conduit/pipe and other fluid turbulence losses as the media moves there through) and the static head requirement (this being the vertical lift or height that the entrained media is required to travel as it moves through the conduit/ pipe system) toward the intended or objective delivery destination.

In one embodiment, the target concentration or density of grinding media determined to be suitable for enabling supply of the mixed flow of liquid and grinding media to the selected destination by the second media transfer means or module is in a range from about 1.1 to about 1.6 specific gravity. In another embodiment, the target concentration or density of grinding media is determined to be about 1.25 specific gravity.

Attributes of the respective flow conditions (of, for example, the flow of liquid media entering the first inlet, the flow of grinding media entering the second inlet, the mixed flow of liquid and grinding media entering the second media transfer module, the mixed flow of liquid and grinding media as discharged from the second media transfer module) may comprise any of the following: the pressure of the relevant flow, the density or specific gravity of the relevant flow, the mass flow rate of the relevant flow, the volumetric flow rate of the relevant flow, the velocity of the relevant flow. Desired relationships or ratios between various of the (flow) attributes of the respective flow conditions can be generated, modified, and/or substantially maintained as needed for facilitating hydro-transportation/conveyance of the grinding media to or toward the selected delivery destination at desired or target conditions of flow velocity and density (or specific gravity) of the mixed flow of liquid and grinding media. Changes in the operation of one or both first, second media transfer modules may be informed on an assessment or determination of any of the attributes of various of the flow conditions (which assessment/determination could be based on, for example, physical sensing of one or more relevant flow attribute(s) in conjunction with appropriate calculation methods/techniques using relevant fluid theory).

One or both media transfer modules may be configured operable so that respective flow conditions each generate are operable or cooperable with the other for facilitating mixing and or entraining of the flows of the liquid media and the grinding media so as to achieve and or substantially maintain a desired or target density or specific gravity of the flow condition of the mixed flow of liquid and grinding media (hereinafter, entrained media) suitable for facilitating conveyance or delivery of the grinding media in the entrained media flow to or toward the delivery destination at a desired or target delivery or flow velocity. In one example, the desired or target delivery or flow velocity is in a range from about 2 to about 3 metres per second.

The system may be configured operable so that control and or maintenance of the delivery velocity of the flow condition of the entrained media may be achieved by, at least in part, selective operation of the second media transfer module, and which operational adjustment(s) serves to influence, at least in part, the density or specific gravity of the entrained media in that the quantity of the grinding media drawn through the second inlet can be varied with substantially no proportional change (for example, increase) in the quantity of liquid media discharged from the first media transfer module for introduction into the first inlet. In a practical operational embodiment, the first media transfer module is operated (or caused to be operated) so as to be responsive to any determined change in the operation of the second media transfer module for seeking to maintain a desired density or specific gravity of the entrained flow. In this manner, the density or specific gravity of the entrained media suitable for hydro-transport or conveyance of the entrained media to the delivery destination may be, at least in part, generated, modified, and or substantially maintained by respective operation of one or both of the first and second media transfer modules.

The system may be configured operable so that control or regulation of a density or specific gravity of the flow condition of the entrained media may be achieved by, at least in part, selective operation of the first media transfer module for varying the quantity of the liquid media introduced through the first inlet for engagement with the flow of the grinding media. In practice, such operational adjustment may serve to influence, at least in part, the flow condition of the entrained media discharged from the second media transfer module. In this manner, discharge from the second media transfer module is a product from the respective quantities of the liquid media discharged from the first media transfer module and the grinding media introduced or drawn through the second inlet.

Optionally, the system is configured operable so that operation of one or both of the first, second media transfer modules may be managed or caused to be managed so that a pressure of the flow condition of the liquid media discharged from the first media transfer module at or near where it enters the first inlet is or is caused to be generated, controlled/regulated, and or substantially maintained (for example, by way of the first media transfer module being appropriately operated or controlled, or caused to be operated/controlled (for example, by a suitably designed control system operated via a programmable logic controller (PLC))) so as to generate and or substantially maintain a pressure differential relative to the pressure of the flow condition of the grinding media at or near where it enters the second inlet. In various forms as may be required, the pressure differential maybe negative or positive.

Optionally, the system is configured operable so that operation of one or both of the first, second media transfer modules is managed or caused to be managed so that a pressure of the flow condition of the liquid media discharged from the first media transfer module for entry into the first inlet is or is caused to be generated, controlled/regulated, and or substantially maintained (for example, by way of the first media transfer module being appropriately operated or controlled, or caused to be operated or controlled) so as to generate and or substantially maintain a pressure that is less than a pressure of the flow condition of the grinding media at or near where it enters the second inlet. In this manner, a pressure gradient can be generated and or substantially maintained for assisting in inducing a flow of grinding media through the second inlet for mixing/entrainment with the liquid media. Such a pressure gradient may be referred to as a 'negative pressure differential'.

Without being bound by theory and/or testing data gathered to date, in generating, controlling/regulating, and or substantially maintaining either a negative or positive pressure differential between the pressure of the flow condition of the liquid media at or near where it enters the first inlet and the pressure of the flow condition of the grinding media at or near where it enters the second inlet, the pressures of the respective flow conditions may be as follows: the pressure of the flow condition of the liquid media at or near where it enters the first inlet (for example, discharged from the first media transfer module) may be from about 0.6 Bar to about 1.5 Bar, and the pressure of the flow condition of the grinding media at or near where it enters the second inlet may be from about 0.5 Bar to about 1.3 Bar. The absolute value and or the ratio of the pressures for either flow condition will depend on the duty application (for example, requiring consideration of the relevant system head and friction loss characteristics) the media handling system is configured for. In some situations, a contributing element to the flow conditions at the first, second inlets may include the static fluid head at the second inlet as this is likely to or will vary dependent on the grinding mill type and charge level. Operational control of the first media transfer module may be managed so as to be responsive to pressures due to such static fluid head and/or the system head downstream of the second media transfer module.

In another application, the system is configured operable so that a pressure of the flow condition of the liquid media discharged from the first media transfer module for entry into the first inlet may be generated, controlled/regulated, and or substantially maintained by way of the first media transfer module being appropriately operated or controlled, or caused to be operated or controlled, so as to generate, control/regulate, and or substantially maintain a pressure that is greater than the pressure of the flow condition of the grinding media at or near where it enters the second inlet (for example, a positive pressure differential). In this manner, where respective flows of the liquid media and the grinding media engage for mixing/entrainment purposes a dynamic pressure environment can be created to assist in the induction and mixing/entrainment of a flow of, for example, saturated grinding media through the second inlet toward the second media transfer module.

Optionally, the system is configured operable so that operation of one or both of the first, second media transfer modules is managed or caused to be managed so that a pressure of the flow condition of the liquid media discharged from the first media transfer module and the pressure of the flow condition of the entrained media discharged from the second media transfer module (in one embodiment, for example, via operation of the respective first, second media transfer modules in a bilateral manner) are caused to be controlled and or regulated so that a substantially negative relationship is generated, controlled/regulated, and or substantially maintained between the respective pressures of the flow conditions of the entrained media entering and discharged from the second media transfer module. In this manner, said negative relationship involves the pressure of the flow condition of the entrained media entering the second media transfer module being less than the pressure of the flow condition of the entrained media discharged from the second media transfer module. Control/regulation of such negative relationship operates to maintain a desired performance profile of the second media transfer module for achieving and or controlling a desired discharge flow velocity of the flow condition of the entrained media from the second media transfer module despite the relevant head and friction loss characteristic(s) of the system as designed or determined for the relevant duty application.

Optionally, the system is configured operable so that one or both of the first and second media transfer modules are configured so as to be operable or caused to be operable for generating, controlling/regulating, and or maintaining a pressure of the flow condition of the entrained media discharged from the second media transfer module so as to be greater than any pressure caused due to a relevant duty system head and/or friction loss characteristic(s) for the relevant duty application as may be determined (for example, through testing and/or calculable assessment) (driven by the relevant duty application). The skilled reader will appreciate that the range of the duty system head is a function of the length of the pipeline including relevant fluid velocity, pipeline geometry (for example, pipe bends and similar geometrical disruptions in the pipeline network), density of the mixed flow of liquid media and grinding media (which drives the friction head loss component created as a result of media rubbing against the internal wall of the conduit/pipe and other fluid turbulence losses as the media moves there through) and the static head requirement (this being the vertical lift or height that the entrained media is required to travel as it moves through the conduit/pipe system) toward the delivery destination.

Optionally, the system is configured operable so that one or both of the first and second media transfer modules are configured so as to be operable or caused to be operable for generating, controlling/regulating, and or substantially maintaining a volumetric flow rate of the flow condition of the entrained media discharged from the second media transfer module that is sufficient for enabling a velocity of the flow condition of the entrained media flow to be from about 2 to about 3 metres per second notwithstanding losses caused due to the relevant system head and/or friction characteristic(s) for the relevant duty application as may be determined (for example, through testing and/or calculable assessment).

A rate of delivery (for example, flow velocity) of the entrained media to/toward the delivery destination may be influenced, at least in part, by any of the following: one or more geometrical parameters (such as for example, the diameter, length, bends etc) of the network of conduit or pipe sections used to fluidly connect the discharge outlet of the second media transfer module with the delivery destination, the elevation or vertical lift (against gravity) needed to be achieved by the network of conduit or pipe sections in the transfer of the entrained media flow to the delivery destination.

The second media transfer module may be configured so as to be operable or caused to be operable so that one or more flow attributes (for example, any of the pressure, density, mass flow rate and/or volumetric flow rate) of the flow condition of the entrained media discharged from the second media transfer module is variable (for example, modified as required by way of changing an operating characteristic of the operational state of the second media transfer module, for example, operational running speed) as might be needed in response to variations (for example, as might be determined due to physical sensing and/or calculable assessment) to any flow attribute(s) (for example, any of the pressure, density, mass flow rate and volumetric flow rate) of the flow condition of the liquid media discharged from the first media transfer module in order to substantially generate, control/regulate, and or maintain a differential between the pressure of the flow condition of the entrained media at or near the inlet of the second media transfer module and the pressure of the flow condition of the entrained media discharged from the second media transfer module that facilitates or enables drawing or urging of the flow of the grinding media through the second inlet.

In one form, for example, a pressure and volumetric flow rate of the flow condition of the entrained media discharged from the second media transfer module can be varied (or caused to be varied) by way of operation of the second media transfer module by way of monitoring and/or assessment of the pressure and flow rate (one or both of the mass flow rate and volumetric flow rate) of the flow condition of the liquid media discharged from the first media transfer module for generating and/or substantially maintaining a flow inducing differential or relationship (enabling the introduction of the flow of grinding media through the second inlet) between the pressures of the flow conditions of the entrained media entering and discharged from the second media transfer module respectively.

In another form, for example, the differential between the pressure of the flow condition of the entrained media at or near the inlet of the second media transfer module and the pressure of the flow condition of the entrained media discharged from the second media transfer module that facilitates or enables drawing or urging of the flow of the grinding media through the second inlet is negative in that the pressure of the flow condition of the entrained media entering the second media transfer module is less than the pressure of the flow condition of the entrained media exiting or discharged therefrom.

In one embodiment, the system is configured operable so that, based at least in part on the monitoring or determination/assessment (directly or indirectly) of one or more flow attribute(s) (for example, flow pressure, density or specific gravity) of the flow condition of the grinding media entering the second inlet (in order to derive, for example, or determine its density of specific gravity), operation of one or both of the first, second media transfer modules may be managed (or caused to be managed) so that a ratio (eg. a desired or target ratio) of one or both of the mass flow rate and the volumetric flow rate of the flow condition of the grinding media at or near where it enters the second inlet with respect to the mass flow rate and the volumetric flow rate respectively of the flow condition of the liquid media at or near where it enters the first inlet, is or is caused to be generated, controlled/regulated and or substantially maintained for drawing or urging of the flow of the grinding media through the second inlet for generating, controlling/regulating, and or substantially maintaining a density or specific gravity of the flow condition of the entrained media to be from about 1.1 to about 1.6.

In one example, based at least in part on the monitoring of the density or specific gravity of the flow condition of the grinding media entering the second inlet, a ratio (eg. a desired or target ratio) of the mass flow rate of the flow condition of the grinding media entering the second inlet with respect to the mass flow rate of the flow condition of the liquid media entering the first inlet is from about 0.2 to about 1.6, and/or a ratio (eg. a desired or target ratio) of the volumetric flow rate of the flow condition of the grinding media entering the second inlet with respect to the volumetric flow rate of the flow condition of the liquid media entering the first inlet is less than unity, or, in another example, about 0.96.

In one embodiment, the second media transfer module is operated at an operational state determined to be suitable for supplying the mixed flow of liquid and grinding media to the selected destination, and the first media transfer module is configured operable so that its operational state is controllable relative or in relation to, or having regard to, the operational state of the second media transfer module for controllably modifying the concentration of grinding media in the mixed flow of liquid and grinding media so as to converge toward and or substantially maintain the target concentration of grinding media. In one form, the target density or specific gravity of the flow condition of the entrained media is to be from about 1.1 to about 1.6. In another form, the desired or target density or specific gravity of the flow condition of the entrained media to be about 1.25.

Suitable sensing instrumentation may be configured so as to operate to monitor the density or specific gravity of the flow condition of the grinding media entering the second inlet. A suitable 'closed loop' control system can be configured so as to operate to control or regulate the performance of the first media transfer module so that one or more flow attributes (for example, flow pressure, volumetric flow rate, flow velocity) of the flow condition of the liquid media discharged therefrom for entry into the first inlet is sufficient for, in one sense, operating or cooperating with the flow condition generated by the second media transfer module for enabling the drawing or urging of the flow of the grinding media through the second inlet for achieving a density or specific gravity of from about 1.1 to about 1.6 of the entrained media.

The first and second inlets may be defined or provided by way of a junction module fluidly connected between the first media transfer module and the second media transfer module, the junction module defining/providing (i) the first inlet arranged for receiving the flow of the liquid media, (ii) the second inlet arranged for receiving the flow of the grinding media, and (iii) an outlet toward which the flows of the liquid and grinding media moves for discharge from the junction module toward the second media transfer module as a substantially mixed/entrained flow. In one form, the junction module is formed so as to provide an enclosed region of the space but for the presence of the first and second inlets, and the outlet.

The junction module may be provided in the form of a suitably shaped or formed component or module. In one such form, the junction module is arranged in the form of an inverted "T" shape, whereby the first inlet is provided at or near a free end of the 'horizontal' segment (eg. for fluid connection with the first media transfer module), the second inlet is provided at or near a free end of the 'vertical' segment (eg. for fluid connection with an outlet of a supply of grinding media such as, for example, a grinding mill or hopper containing grinding media), and the junction module's outlet is provided at or near the alternate free end of the 'horizontal' segment (eg. for fluid connection/communication with the second media transfer module).

In another such component/modular form, the junction module may be configured so that the flow of the grinding media received by the second inlet is received in accordance with a first direction of flow, and which flow progresses toward the junction module's outlet for discharge therefrom in accordance with a second direction of flow, whereby the flow of the liquid media received by the first inlet is directed along a path so as to engage or interact with the flow of the grinding media in a substantially tangential manner with respect to a portion of a path along which the grinding media transitions from the first direction of flow to the second direction of flow for facilitating mixing/entrainment of the respective flows as they progress toward the junction module's outlet.

The second inlet and the outlet of the junction module are configured so that the first and second directions of flow are angularly offset relative to one another, or, in one form, about 90 degrees relative to one another.

Sensing instrumentation (for example, pressure sensing transducer devices, flow rate sensing transducer devices, a monometer, a densitomer, Coriolis flow (rate) meter, magnetic flow meter, density meter (being of a nuclear, Coriolis, ultrasound, microwave, or gravitic type)) may be provided at one or more locations upstream or downstream of any of the following so as to create a control arrangement (which, for example, may be enabled as a 'closed loop' control arrangement) for controlling operation of the first, second media transfer modules in the manner required for realising any of the required relationships or ratios between the flow attributes of the respective flow conditions of grinding media, liquid media, entrained media (as entering the second media transfer module or as discharged from the second media transfer module), as described herein for controllably modifying the concentration of the grinding media for achieving the desired density or specific gravity of the entrained media: the first media transfer module, the second media transfer module, any of the first, second inlets, the outlet of the junction module. Data from any of the sensing instrumentation may be used in conjunction with suitable/relevant fluid theory and/or experimentally obtained empirical relationships for determining any flow attributes for use in enabling any such control arrangement for managing the operation of any of the embodiments of the media handling system described herein. Any control arrangement ('closed loop' or otherwise) configured for managing operation of any such embodiments of the media handling system described herein may be enabled by way of a programmable logic controller (PLC).

In some forms of the junction module, respective control valves (such as for example, knife gate valves (electrically activated), pinch valves, pinch/ball valves, check valves, butterfly valves) or like means or modules may be fitted so as to be in fluid communication (either upstream or downstream thereof) with any of the following: the first inlet, the second inlet, the junction module's outlet, the first media transfer module, the second media transfer module, the pipe/conduit assembly which may be arranged (for example, via a fluid coupling arrangement) in fluid communication with and downstream of the second media transfer module.

Embodiments of the media handling system may comprise or be arranged in fluid communication with a supply or store of liquid media. In one form, for example, such supply of liquid media may be by way of a first storage vessel configured for storing or holding the liquid media and from which the liquid media is received by the first media transfer module for delivery/introduction to the first inlet. In another form, for example, a supply of liquid media is by way of an outlet from which liquid media of any suitable form can be sourced. Embodiments of the media handling system may comprise or be arranged in fluid communication with a supply or store of grinding media. In one form, for example, such supply of grinding media may be by way of a second storage vessel configured for storing or holding the grinding media (eg. a hopper or like vessel) and from which grinding media can be introduced, drawn, or urged through the second inlet. In some embodiments, the second storage vessel may be (or part of) grinding mill equipment from which grinding media contained therein is to be discharged therefrom using embodiments of the media handling system described herein for transfer/conveyance to a suitable storage/holding bin or vessel.

Embodiments of the media handling system may comprise any number of conduits, pipes, tubes suitable for use in conveying flows of the liquid media or grinding media either individually or as entrained as may be needed. Any such conduits, pipes, tubes may host or be provided in fluid communication with one or more valves configured operable for controlling flows/streams of media therethrough, either individually or entrained. Such valves may comprise any of the following: knifegate valves, pinch valves, pinch/ball valves, check valves, butterfly valves.

The discharge outlet of the second media transfer module may be arranged in fluid communication with a sieve module configured for receiving a flow of entrained media and filtering same so that constituent parts or components of the entrained media are directed for delivery to or toward respective destinations. In one form, the sieve module is configured so as to filter entrained media so that the liquid media is directed for delivery to a supply of liquid media (currently used or otherwise) or the first storage vessel, and the grinding media is directed for delivery to a grinding mill, the second storage vessel, or another grinding media storage/holding vessel.

Embodiments of the media handling system may be configured so as to be operable in a mode of operation in which the liquid media is transferred or moved through the first inlet and discharged from the second media transfer module without mixing/entraining of the liquid media and the grinding media. In one form, such a mode of operation is referred to as an 'idling' mode of operation serving to prevent the ingression of air into the fluid pathways/circuits or flow paths of the media handling system and or maintain the system in a 'primed' state prior to use for charging or discharging grinding media to/from various of grinding mill equipment/storage vessels. In this manner, the first media transfer module may be configured operable so that a respective flow condition of the liquid media generated by the first media transfer module for introduction into the first inlet is sufficient to meet the flow requirements or demands of an operational state of the second media transfer module.

The media handling system may be fixedly supported or mounted on a suitably formed structure or platform of a support assembly so as to provide a transportable media handling module allowing the principles of the media handling system described herein to be portable/transportable for use at different locations.

In one embodiment, the first, second inlets, and the first, second media transfer modules may be substantially enclosed within a profile or envelope defined by a frame structure supported or associated with the support assembly. The support assembly and frame structure may be configured so as to be transportable thereby allowing the media handling system to be transported for use at different locations. The frame structure may comprise one or more engaging devices such as, for example, lifting lugs, pad-eyes or like devices, suitable for engaging with lifting equipment/apparatus for lifting the structure for positioning of the media handling module as needed.

The inlet of the first media transfer module may be arranged in fluid communication (which could comprise an appropriate configuration or modification being made to the inlet of the first media transfer module) with a suitable supply or store of liquid media (for example, an outlet from which liquid media can be sourced or a storage/holding vessel arranged for storing or holding liquid media) so that the liquid media can be provided to the first inlet; the second inlet may be arranged in fluid communication (which could comprise an appropriate configuration or modification being made to the second inlet) with a suitable supply or store (for example, a storage vessel arranged for storing or holding the grinding media) so that the grinding media can enter the second inlet; the second media transfer module may be arranged in fluid communication (which could comprise an appropriate configuration or modification being made to, for example, an outlet of the second media transfer module) with one or more further fluid circuit(s) or flow pathway(s) (for example, via a pipe or conduit network) in fluid communication with a selected target delivery destination to which a flow of entrained media is to be delivered/supplied.

The frame structure may be cladded with suitable panels/substrates, which may be configured so as to allow sufficient access to respective connecting pipe or conduit sections which fluidly communicate with an inlet of the first media transfer module (allowing receipt of the liquid media), the second inlet (allowing receipt of the grinding media), and the discharge outlet of the second media transfer module (allowing discharge of the entrained media) for allowing fluid coupling/connection to be established with external pipe/conduit sections providing delivery/supply of, respectively, the liquid media, grinding media, and discharged entrained media from the media handling module.

The media handling module may comprise suitable electronics/circuitry (such as one or more PLC units, for example) for enabling control of the relevant componentry for enabling operation (in a substantially autonomous manner or otherwise). Such electronics may be provided in a control box that is mounted with the support assembly of the frame structure. In this manner, the media handling module can enable the principles of the media handling system described herein to be realised at any desired (remote) location to which it is transported.

According to a fourth aspect, there is provided a media handling system for mixing/entraining grinding media with a liquid media for supply, the media handling system comprising:
 a first media transfer means or module configured operable at or in a first operational state for providing a flow of liquid media to a first inlet by way of which liquid media is receivable by the media handling system,
 a second media transfer means or module arranged in fluid communication with and downstream of the first inlet and a second inlet by way of which grinding media is receivable by the media handling system, and configured operable at or in a second operational state for supplying a mixed flow of liquid and grinding media,
 wherein operation of one or both of the first and second media transfer means/modules is configured manageable so as to modify the first and/or second operational states so that one or both of said flows are operable or cooperable for controllably modifying a concentration of grinding media in the mixed flow of liquid and grinding media supplied by the second transfer media module.

According to a fifth aspect, there is provided a media handling system for mixing/entraining grinding media with a liquid media for supply, the media handling system comprising:
 a first media transfer means or module operable for providing a flow of liquid media at a first flow rate to a first inlet by way of which liquid media is receivable by the media handling system,
 a second media transfer means or module arranged in fluid communication with and downstream of the first inlet and a second inlet by way of which grinding media is receivable by the media handling system, and configured operable for supplying a mixed flow of liquid and grinding media at a second flow rate,
 wherein one or both of the first and second media transfer means/modules are configured operable so as to modify the first and/or second flow rate so as to be operable or cooperable for controllably modifying a concentration of grinding media in the mixed flow of liquid and grinding media supplied by the second transfer media module.

According to a sixth aspect, there is provided a media handling system operable for mixing/entraining grinding media with a liquid media for supply, the media handling system comprising:
 a flow pathway configured for receiving respective flows of a liquid media and grinding media;
 a first media transfer means or module configured operable with the flow pathway for generating a first flow condition for introducing a flow of the liquid media into the flow pathway for engagement with the grinding media;

a second media transfer means or module configured operable with the flow pathway downstream of the reception of the liquid media and the grinding media, and configured operable for generating a second flow condition which is operable or cooperable with the first flow condition for facilitating, at least in part, a flow of grinding media into the flow pathway;

whereby one or both media transfer means/modules are operable so as to modify the first and/or second flow conditions so as to be operable or cooperable for controlling a concentration of grinding media during mixing of both media for supplying the mixed flow by the second media transfer means or module.

According to a seventh aspect, there is provided a method for mixing/entraining grinding media with a liquid media for supplying grinding media to a selected destination by way of a fluid circuit, the method comprising:

configuring a first media transfer means or module so as to be operable for receiving liquid media for providing a flow of same having a respective flow condition to a first inlet by way of which the liquid media is receivable by the fluid circuit, configuring a second media transfer means or module in fluid communication with and downstream of the first inlet and a second inlet by way of which grinding media is receivable by the fluid circuit, and to be operable or cooperable for supplying to the selected destination a mixed flow of liquid and grinding media having a respective flow condition, configuring and or operating, or causing to be operated, one or both of the first and second media transfer means/modules so as to modify one or both respective flow conditions so as to be operable or cooperable for controllably modifying a concentration of grinding media in the mixed flow of liquid and grinding media for supply by the second transfer media module.

According to a further aspect, there is provided a method for mixing and or entraining grinding media with a liquid media for supply to a selected destination by way of a fluid circuit, the method comprising:

configuring a first media transfer means or module so as to be operable for providing a flow of liquid media having a respective flow condition to a first inlet by way of which liquid media is receivable by the fluid circuit, configuring a second media transfer means or module so as to be arranged in fluid communication with and downstream of both of the first inlet and a second inlet by way of which grinding media is receivable by the fluid circuit, and to be operable for supplying to the selected destination a mixed flow of liquid and grinding media having a respective flow condition, configuring and or operating, and or causing to be operated, one or both of the first and second media transfer means or modules so that one or both are operable relative to the other for modifying one or both of the respective flow conditions so as to be operable or cooperable for facilitating a drawing or urging of a flow of the grinding media into the media handling system via the second inlet for controllably modifying a concentration of grinding media in the mixed flow of liquid and grinding media so as to converge toward and or substantially maintain a target concentration of grinding media determined to be suitable for enabling supply of the mixed flow of liquid and grinding media to the selected destination by the second media transfer means or module.

According to another aspect, there is provided a method for mixing and or entraining grinding media with a liquid media for supply to a selected destination by way of a fluid circuit, the method comprising:

configuring a first media transfer means or module so as to be operable for providing a flow of liquid media having a respective flow condition to a first inlet by way of which liquid media is receivable by the media handling system, configuring a second media transfer means or module so as to be arranged in fluid communication with and downstream of both of the first inlet and a second inlet by way of which grinding media is receivable by the fluid circuit, and to be operable for supplying to the selected destination a mixed flow of liquid and grinding media having a respective flow condition, configuring and or operating, and or causing to be operated, one or both of the first and second media transfer means or modules so that one or both are operable having regard to, or in relation to, the operation of the other for modifying one or both of the respective flow conditions so as to be operable or cooperable for facilitating a drawing or urging of a flow of the grinding media into the media handling system via the second inlet for controllably modifying a concentration of grinding media in the mixed flow of liquid and grinding media so as to converge toward and or substantially maintain a target concentration of grinding media determined to be suitable for enabling the generation and or maintenance of a flow velocity of the mixed flow determined to be required to overcome a head characteristic of the media handling system imposed by the selected destination for enabling supply of the mixed flow by the second media transfer means or module.

The methods of the above-described aspects may comprise any of the following features.

Optionally, the method comprises arranging the second media transfer module in fluid communication with one or more flow pathways that fluidly connect the second media transfer module with a delivery destination, which may be elevated above the first, second inlets.

Optionally, the method comprises operating the first media transfer module so that the respective flow condition it generates for introducing the liquid media to the first inlet is insufficient to meet flow requirements or demands of the second media transfer module for its desired operation thereby facilitating, at least in part, a drawing or urging of a flow of the grinding media having a respective flow condition into/through the second inlet for engagement with the flow of the liquid media for mixing/entrainment purposes.

Optionally, the method comprises operating one or both media transfer modules so that the respective flow conditions each generate are operable with the other for facilitating mixing/entraining of the flows of the liquid media and the grinding media so as to achieve and or substantially maintain a desired, target, or determined density or specific gravity of the flow condition of the mixed flow of liquid and grinding media suitable for facilitating conveyance, delivery, or supply of the grinding media to or toward a selected delivery destination and/or at a desired or determined delivery velocity.

Optionally, the method comprises controlling or regulating a density or specific gravity of the flow condition of the mixed flow of liquid and grinding media by, at least in part, selective operation of the first media transfer module so as to vary or modify the quantity of the liquid media introduced through the first inlet for engagement with the flow of the grinding media.

Optionally, the method comprises operating one or both of the first, second media transfer modules so that a pressure of the flow condition of the liquid media discharged from the first media transfer module at or near where it enters the first inlet is or is caused to be generated, controlled/regulated, and or substantially maintained so as to generate and or substantially maintain a pressure differential relative to a pressure of a flow condition of the grinding media at or near where it enters the second inlet.

Optionally, the method comprises operating one or both of the first, second media transfer modules so that a pressure of the flow condition of the liquid media discharged from the first media transfer module for entry into the first inlet is less than a pressure of the flow condition of the grinding media at or near where it enters the second inlet.

Optionally, the method comprises operating one or both of the first, second media transfer modules in a suitable operational manner (for example, a substantially bilateral manner) so that a pressure of the flow condition of the liquid media discharged from the first media transfer module and a pressure of the flow condition of the mixed flow of liquid and grinding media discharged from the second media transfer module are caused to be controlled and or regulated so that a substantially negative relationship is generated, controlled/regulated, and or substantially maintained between the respective pressures of the respective flow conditions of the flow of mixed liquid and grinding media entering and discharged from the second media transfer module, said negative relationship involving the pressure of the flow condition of the mixed flow of liquid and grinding media entering the second media transfer module being less than the pressure of the flow condition of the mixed flow of liquid and grinding media discharged from the second media transfer module.

Optionally, the method comprises operating one or both of the first and second media transfer modules for generating, controlling/regulating, and or maintaining a pressure of the flow condition of the mixed flow of liquid and grinding media discharged from the second media transfer module so as to be greater than any pressure caused due to a determined relevant duty system head and/or friction head loss characteristic(s) for a determined duty application.

Optionally, the method comprises operating one or both of the first and second media transfer modules for generating, controlling/regulating, and or substantially maintaining a volumetric flow rate of the flow condition of the mixed flow of liquid and grinding media discharged from the second media transfer module that is sufficient for enabling a velocity of the flow condition of mixed flow of liquid and grinding media to be from about 2 to about 3 metres per second notwithstanding losses caused due to a determined relevant system head and/or friction characteristics for a determined duty application.

Optionally, the method comprises operating the second media transfer module so that one or more flow attributes of the flow condition of the mixed flow of liquid and grinding media discharged from the second media transfer module are variable as might be needed in response to variations to any flow attribute(s) of the flow condition of the liquid media discharged from the first media transfer module in order to substantially generate, control/regulate, and or maintain a differential between a pressure of the flow condition of mixed flow of liquid and grinding media at or near the inlet of the second media transfer module and a pressure of the flow condition of the mixed flow of liquid and grinding media discharged from the second media transfer module that facilitates or enables drawing or urging of the flow of the grinding media through the second inlet.

Optionally, the differential between the pressure of the flow condition of the mixed flow of liquid and grinding media at or near the inlet of the second media transfer module and the pressure of the flow condition of the mixed flow of liquid and grinding media discharged from the second media transfer module that facilitates or enables drawing or urging of the flow of the grinding media through the second inlet is negative in that the pressure of the flow condition of the mixed flow of liquid and grinding media entering the second media transfer module is less than the pressure of the flow condition of the mixed flow of liquid and grinding media exiting or discharged therefrom.

Optionally, the method comprises monitoring or determining (directly or indirectly) of one or more flow attributes of the flow condition (eg. flow pressure, density or specific gravity) of the grinding media entering the second inlet (in order to derive, for example, or determine its density of specific gravity), the method further comprises, based at least on said monitoring or determining, operating one or both of the first, second media transfer modules so that a ratio or relationship of one or both of a mass flow rate and a volumetric flow rate of a or the flow condition of the grinding media, at or near where it enters the second inlet, with respect to a mass flow rate and a volumetric flow rate respectively of the flow condition of the liquid media, at or near where it enters the first inlet, is or is caused to be generated, controlled/regulated and or substantially maintained for drawing or urging of the flow of the grinding media through the second inlet for generating, controlling/regulating, and or substantially maintaining a density or specific gravity of the flow condition of the mixed flow of liquid and grinding media to be from about 1.1 to about 1.6.

Optionally, the ratio of the mass flow rate of the flow condition of the grinding media entering the second inlet with respect to the mass flow rate of the flow condition of the liquid media entering the first inlet is from about 0.2 to about 1.6, and the ratio of the volumetric flow rate of the flow condition of the grinding media entering the second inlet with respect to the volumetric flow rate of the flow condition of the liquid media entering the first inlet is less than unity.

The method of the present aspect may be enabled by any embodiment of the media handling system or module as described herein.

According to another aspect, there is provided a media handling module operable for use with grinding mill equipment, the media handling module comprising any embodiment of the media handling system described herein mounted on a support assembly configured for transportability.

According to a further aspect, there is provided a grinding mill comprising or arranged in operational use with any embodiment of a media handling system or module as described herein.

According to another aspect, there is provided a method of forming any embodiment of a media handling system or module substantially as described herein.

A method for mixing and or entraining grinding media with a liquid media for supply to a selected destination, the method comprising:
  providing, supplying, or configuring for use any embodiment of a media handling system arranged in accordance with the media handling apparatus of any of the first, second, or third aspects, or as otherwise described herein, and or providing or supplying a quantity of liquid media for receipt by way of the first inlet of said embodiment, and or providing or supplying a quantity of grinding media (fluidised or otherwise) for receipt by way of the second inlet of said embodiment, and or operating, or causing to be operated, said embodiment for supplying a portion of the grinding media to the selected destination.

Embodiments of the aspects described herein may provide any of the following advantages: effective hydro-transport of grinding media to overcome delivery system head and friction losses, ability to control combined density of the mixed flow of liquid media and grinding media so as to reduce wear on the relevant operational components, ability to control combined density to ensure effective performance of the first, second media transfer modules (eg, when exemplified by appropriate pump devices), incorporation of intelligent control systems (eg. PLC modules) to monitor and regulate control parameters to seek to ensure stable system performance with varied input parameters (eg. flow attributes of the flow condition of the flow of grinding media entering the second inlet), ability to provide a generally compact mobile modular design to allow for flexibility of use in multiple duty requirements at different locations.

Various aspects described herein can be practiced alone or combination with one or more of the other aspects, as will be readily appreciated by those skilled in the relevant art. The various aspects can optionally be provided in combination with one or more of the optional features described in relation to the other aspects. Furthermore, optional features described in relation to one example (or embodiment) can optionally be combined alone or together with other features in different examples or embodiments.

For the purposes of summarising the aspects, certain aspects, advantages and novel features have been described herein above. It is to be understood, however, that not necessarily all such advantages may be achieved in accordance with any particular embodiment or carried out in a manner that achieves or optimises one advantage or group of advantages as taught herein without necessarily achieving other advantages as may be taught or suggested herein.

It is to be understood that each document, reference, patent application or patent cited in this text is expressly incorporated herein in their entirety by reference, which means that it should be read and considered by the reader as part of this text. That the document, reference, patent application, or patent cited in this text is not repeated herein is merely for reasons of conciseness.

Furthermore, in this specification, where a literary work, act or item of knowledge (or combinations thereof), is discussed, such reference is not an acknowledgment or admission that any of the information referred to formed part of the common general knowledge as at the priority date of the application. Such information is included only for the purposes of providing context for facilitating an understanding of the inventive concept/principles and the various forms or embodiments in which those inventive concept/principles is/are exemplified.

SUMMARY OF DRAWINGS

In order to provide a better understanding of the present invention, a preferred embodiment will now be described in detail, by way of example only, with reference to the accompanying drawings:

FIG. 4 shows three schematic control diagrams each describing the control flows of the following: A—Grinding Media Inlet Pressure Differential, B—Bilateral Control of Delivery and Dilution Pump, C—Density Control/Regulation;

FIG. 5 shows an end view of an embodiment of an integration module operable with embodiments of the media handling systems described herein;

FIG. 6 shows a cross-section view of the embodiment of the integration module shown in FIG. 5;

Figure 1:
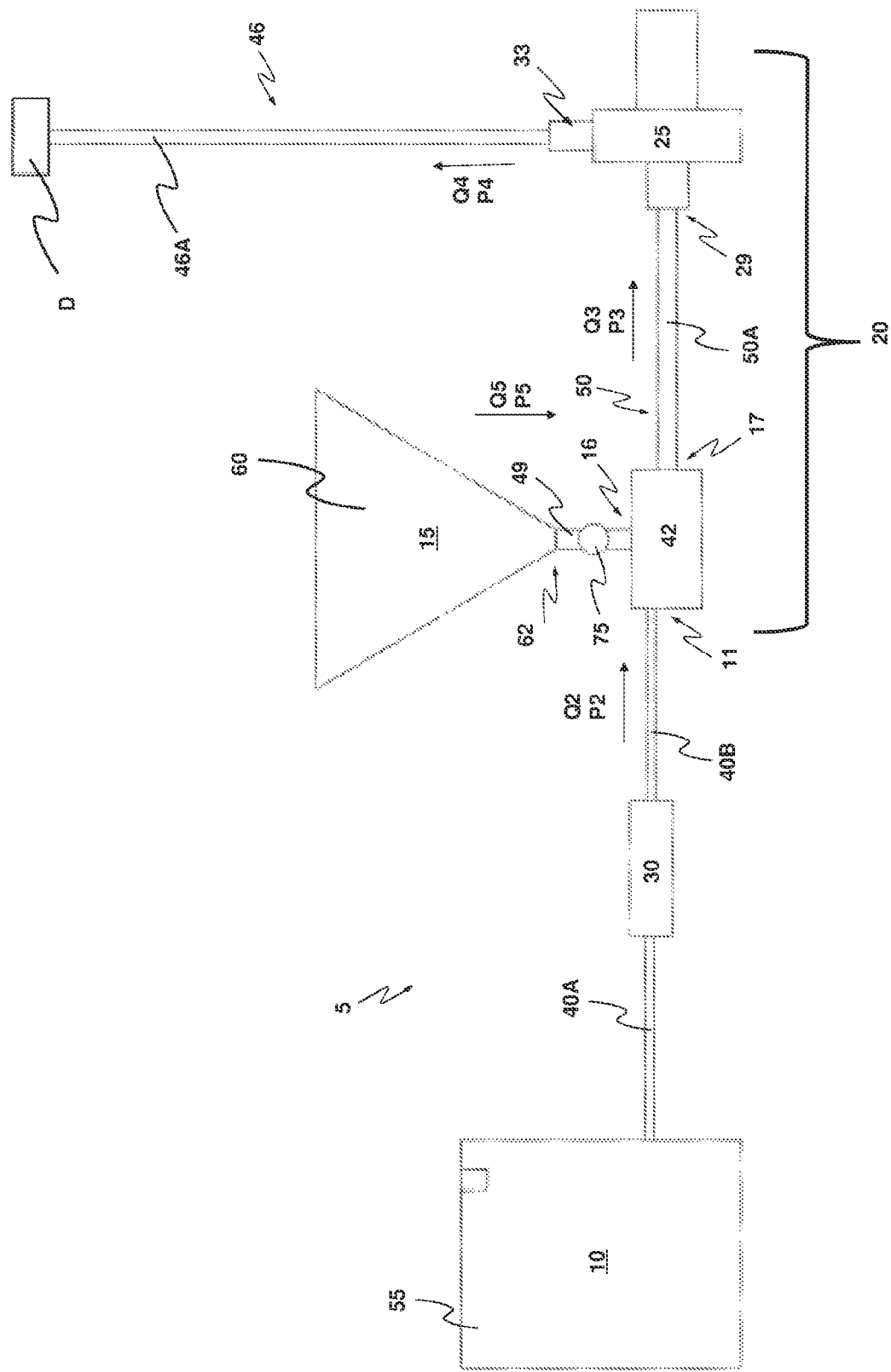
FIG. 1 shows a schematic view of one embodiment of a media handling system arranged in accordance with the principles described herein.

In the figures, like elements are referred to by like numerals throughout the views provided. The skilled reader will appreciate that elements in the figures are illustrated for simplicity and clarity and have not necessarily been drawn to scale. For example, the dimensions and/or relative positioning of some of the elements in the figures may be exaggerated relative to other elements to facilitate an understanding of the various embodiments exemplifying the principles described herein. Also, common but well understood elements that are useful or necessary in a commercially feasible embodiment are often not depicted in order to provide a less obstructed view of these various embodiments. It will also be understood that the terms and expressions used herein adopt the ordinary meaning as is accorded to such terms and expressions with respect to their corresponding respective areas of inquiry and study except where specific meanings have otherwise been set forth herein.

It should be noted that the figures are schematic only and the location and disposition of the components can vary according to the particular arrangements of the embodiment(s) as well as of the particular applications of such embodiment(s).

Specifically, reference to positional descriptions, such as 'lower' and 'upper', and associated forms such as 'uppermost' and 'lowermost', are to be taken in context of the embodiments shown in the figures, and are not to be taken as limiting the scope of the principles described herein to the literal interpretation of the term, but rather as would be understood by the skilled reader.

Embodiments described herein may include one or more range of values (eg. pressure ratios, volumetric flow rates, mass flow rates, flow densities, specific gravities, specific densities etc). A range of values will be understood to include all values within the range, including the values defining the range, and values adjacent to the range which lead to the same or substantially the same outcome as the values immediately adjacent to that value which defines the boundary to the range.

Other definitions for selected terms used herein may be found outlined above or within the detailed description below and apply throughout. Unless otherwise defined, all other scientific and technical terms used herein have the same meaning as commonly understood to one of ordinary skill in the art to which the embodiment(s) relate.

DETAILED DESCRIPTION

The words used in the specification are words of description rather than limitation, and it is to be understood that various changes may be made without departing from the spirit and scope of any aspect of the inventive principles as described herein. Those skilled in the art will readily appreciate that a wide variety of variations, modifications, alterations, and combinations can be made with respect to the above and below described embodiments without departing from the spirit and scope of any aspect of the invention, and that such variations, modifications, alterations, and combinations are to be viewed as falling within the ambit of the inventive concept.

Throughout the specification and the claims that follow, unless the context requires otherwise, the word "comprise" or variations such as "comprises" or "comprising", will be understood to imply the inclusion of a stated integer or group of integers but not the exclusion of any other integer or group of integers.

Furthermore, throughout the specification and the claims that follow, unless the context requires otherwise, the word "include" or variations such as "includes" or "including", will be understood to imply the inclusion of a stated integer or group of integers but not the exclusion of any other integer or group of integers.

FIG. 1 shows a schematic view of an embodiment of a media handling system 5 which exemplifies the principles described herein and configured operable for use with grinding mill equipment. Application of the principles described herein as embodied with the media handling system 5 include the charging (eg. the transportation of selected grinding media through a pipeline, using plant service or process water as a carrier liquid, to a grinding mill, ie. hydro-transportation) and discharging/removal of grinding media to/from a grinding mill 65 (eg. a vertically orientated or tower form grinding mill). The skilled reader will be well versed with the operation and purpose of such grinding mill equipment and therefore the details of same will not be outlined further herein for reasons of conciseness.

Embodiments of the media handling system 5 (hereinafter, system 5) may be exemplified in the form of a closed fluid circuit operating to receive respective streams or flows of liquid media and grinding media (generally as a fluidised stream or flow) which undergo appropriate mixing/entrainment within the fluid circuit as determined to be suitable for onward supply/transfer to a selected intended delivery destination at a downstream end of the fluid circuit. Accordingly, in one broad form, and with reference to FIG. 1, the system 5 is operable for receiving respective streams or flows (such as for example, at separate respective locations or regions) of a liquid media 10 and a grinding media 15 for mixing/entrainment and supply to a selected/intended or objective delivery destination D. In this manner, the system 5 comprises a first inlet 11 arranged for receiving the liquid media 10, and a second inlet 16 arranged for receiving the grinding media 15. The liquid media 10 (or possibly a slurry) is sourced from an appropriate supply or store of liquid media 10 (in some forms, the supply of liquid media 10 can be sourced from any appropriate available water source such as, for example, a process or service water outlet). In the form shown in FIG. 1, the supply of liquid media 10 is by way of a storage/holding vessel (hereinafter, reservoir 55). The liquid media 10 serves to assist in the conveyance of the grinding media 15 and controlling of the concentration of the grinding media 15 during a mixing/entrainment event. Hereinafter, the liquid media 10 is referred to as the dilution fluid 10.

The grinding media 15 is provided in the form of grinding balls often made or provided in the form of a solid particulate, such as a ceramics material, used for the purpose of performing a grinding action/function in a grinding mill. Grinding media is also available in other forms, such as metallic material particulate. The stream or flow of grinding media 15 is often provided in a saturated or fluidised form, which saturation or fluidisation provides a head of liquid fluid (which could be clear water or reused process or service water, an appropriate slurry, or an aqueous mineral suspension) which accompanies the grinding media 15 thereby providing a saturated or fluidised solution or slurry for assisting with hydro-transport of the grinding media 15 into the fluid circuit of the system 5. The head of liquid water (or other fluid) serves to prevent air from being introduced/drawn or sucked into the fluid circuit of the system 5. In order to provide the grinding media 15 in a condition or state (which condition or state is determined by reference to the selected delivery destination D) in which it can be transferred to the intended delivery destination D (or charged to/from a grinding mill or suitable storage vessel), the grinding media 15 is (further) fluidised by the addition of the dilution fluid 10 (which dilution fluid could also be either clear water or reused process or service water, an appropriate slurry, or an aqueous mineral suspension).

The system 5 further comprises a first media transfer means or module 30 configured operable for providing a flow Q2 of the dilution fluid 10 having a respective flow condition to the first inlet 11. The flow condition of the flow Q2 of dilution fluid 10 to the first inlet 11 is sufficiently regulated or controlled by way of the first media transfer module 30 so as to enable a desired or known volumetric flow rate to be provided. For the embodiment shown in FIG. 1, and in the testing of prototype configurations described below and shown in FIG. 9, the first media transfer module 30 is provided in the form of a centrifugal pump 32. In other forms, the first media transfer module 30 could be provided in the form of a pressure pump, a peristaltic pump, a progressive cavity pump (eg. A Netzsch PV Nemo 063 progressive cavity pump, which has shown good performance in various implementations of the principles described herein tested to date), a pressure pump, a rotary lobe pump, a diaphragm pump, a piston pump, or a screw pump. In substance, the first media transfer module 30 could comprise any device capable of providing a desired or selected fixed volumetric flow rate regardless of the pressure at its outlet or downstream therefrom. Hereinafter, the first media transfer module 30 will be referred to as the dilution pump 30 for at least the reason that it feeds the dilution fluid 10 for receipt by the first inlet 11.

The system 5 further comprises a second media transfer means or module 25 arranged in fluid communication with and downstream of the first 11 and the second 16 inlets and is configured operable for delivering or supplying a mixed flow of the dilution fluid 10 and grinding media 15 having a respective flow condition Q4. In one form the second media transfer module 25 comprises a vortex pump (eg. A HM75 vortex pump arranged operable with a 22 Kw motor in one test configuration) but could comprise a centrifugal pump or a peristaltic pump. Hereinafter, the second media transfer module 25 will be referred to as the delivery pump 25 in that it drives the delivery of the mixed flow of dilution fluid 10 and grinding 15 media to/toward the delivery destination D.

In at least one mode or state of operation of the system 5, one or both of the dilution 30 and delivery 25 pumps are configured operable so as to respectively modify one or both of the respective flow conditions of the dilution fluid 10 and the mixed flow of dilution fluid 10 and grinding 15 media so that the respective flows are operable or co-operable for controllably modifying the concentration of the grinding media 15 in the mixed flow of the dilution fluid 10 and the grinding media 15 (hereinafter, entrained media) delivered/supplied by the delivery pump 25 to the selected delivery destination (D). One or both of the dilution 30 and delivery 25 pumps are operated relative or in relation to each other (or by having regard to the operation of the other) so that the flows generated can be modified as required in order to converge toward, and/or substantially maintain, a desired or target concentration (ie. Density or specific gravity) of grinding media 15 which is determined to be suitable for enabling supply of the entrained media to the selected delivery destination (D) by the delivery pump 25. The suitability of the determined desired target concentration of the grinding media 15 is that which is considered suitable for enabling the generation and or maintenance of a flow velocity of the entrained media which is determined to be required to overcome a head or pressure characteristic of the system 5 imposed by the selected delivery destination (D) for enabling supply of the entrained media flow by the delivery pump 25.

As noted above, the term "flow condition" as used herein refers to the state of a flow of media having regard to a number of attributes that the relevant flow of media comprises. Such attributes can be varied or modified by way of the operation of one or both of the dilution 30 and delivery 25 pumps (eg. Increasing or decreasing their respective running speeds relative to the other so as to modify the respective flow rates they produce) so as to modify the relevant flow conditions so that they are operable or co-operable for use in controlling the amount of grinding media 15 introduced into the second inlet 16 for mixing with the incoming dilution fluid 10.

Broadly, the principles described herein enable the capability of controllably modifying the concentration of the grinding media 15 during the mixing/entrainment process for hydro-transport purposes by way of managing operation of one or both of the dilution 30 and delivery 25 pumps so as to modify the flow conditions they generate or have an influence on. These flows then work together for drawing or urging grinding media 15 in the second inlet 16 in a controllable manner (which can be of particular advantage where ceramic grinding media is used so as to reduce the risk of breakage during entry into the system and mixing/entrainment due to the inherent hard/brittle nature of the ceramic particulate) so as to converge toward and or sustain/maintain the desired or target density or specific gravity determined to be suited for the chosen delivery objective (D) of the system 5. When delivering/supplying the entrained flow to a distal and/or elevated delivery destination (D) various attributes of the various flow conditions inform (eg. The determined system head characteristic (including relevant friction loss components) for the selected delivery destination D) how the flow conditions are to be modified by way of the respective dilution 30 and delivery 25 pumps (eg. Changes to their respective operational states, ie. Increasing or decreasing running speeds so as to modify respective flow rates) in order to facilitate effective hydro-transport of the grinding media 15. The operable/cooperable nature of the flow conditions in the system 5 caused by the respective operations of the dilution 30 and delivery 25 pumps allows controlled modification of the concentration of grinding media 15 thereby enabling a desired or target density or specific gravity of the entrained media to be converged toward, and be maintained as needed, for effective delivery of the entrained media given the delivery circumstances, such as system delivery head and friction losses inherent in the desired or intended delivery system/network.

Without being bound by theory or testing to date, a range that the target density or specific gravity of the entrained media is desirous to fall within is between from about 1.1 to about 1.6 (in terms of specific gravity). Testing to date has shown that a target specific gravity of around 1.25 (which equates to a density of about 1,250 kgs/m$^3$) offers good performance characteristics for the head system characteristics tested for a number of practical reasons:

preventing choking of the delivery pump (25) equipment.
allows the quantity of grinding media (15) to be reduced—this assists in, for the case of ceramic grinding media which is inherently hard and brittle, reducing compressive forces exerted on the media which are generated by interactions with moving parts of the pump equipment. As such, for the case of ceramic particulate, reducing grinding media (15) presence has the effect of reducing the potential for damage to the media itself which is consequentially detrimental to the grinding performance. The risk of breakage of ceramic grinding media can be high, as compared metallic grinding media where the risk is much lower.

reducing the friction coefficient and friction losses in the delivery pipeline.

reducing attrition wear of the parts of the delivery pump equipment parts, which facilitates an increase in the wear lifetime of key components in the system.

Mixing or entrainment of the dilution fluid 10 and the grinding media 15, by virtue of the operation of the dilution 30 and the delivery 25 pumps, occurs downstream of the dilution pump 30 and upstream of the delivery pump 25. The intended mixing/entrainment of dilution fluid 10 and the grinding media 15 results in the flow condition of entrained media having various flow attributes suitable to enable transfer to the delivery destination D.

With reference again to the embodiment shown in FIG. 1, the first 11 and second 16 inlets are defined or provided by way of a junction module (hereinafter, integration module 42) which is provided downstream of the reservoir 55 and in which the dilution fluid 10 and the grinding media 15 are received as respective streams or flows via respective first 11 and second 16 inlets. The integration module 42 is positioned downstream of the dilution pump 30 and any vessel (for example, hopper 60 or grinding mill 65) from which grinding media 15 is to be drawn or drained/removed from, and upstream of the delivery pump 25. Once received in the integration module 42, the flows of the dilution fluid 10 and grinding media 15 engage for the purposes of mixing/entrainment. The first 11 and second 16 inlets are arranged in fluid communication with each other.

The entrained media is discharged from the integration module 42 via an outlet 17 for receipt (via conduit 50A of a flow pathway 50) by the delivery pump 25 at its inlet 29. Broadly, the actions of the receiving of the flow of the dilution fluid 10 (flow Q2) and the flow of the grinding media 15 (flow Q5) via respective first 11 and second 16 inlets, the mixing/entrainment of both media flows, and the discharge as a substantially entrained flow Q3 from the junction module's outlet 17 for receipt at the inlet 29 of the delivery pump 25, occurs along a portion of a flow pathway 20. Discharge of the entrained flow from a discharge outlet 33 of the delivery pump 25 is identified as flow Q4. Each of the flows Q2, Q3, Q5, and Q4 have a respective flow condition comprising respective attributes of the respective flow as noted above.

In the arrangement shown in FIG. 1, the integration module 42 is reminiscent of an inverted "T" shape, whereby the inlet 11 is provided at or near a free end (to the left of page) of the 'horizontal' segment, the inlet 16 is provided at or near a free end (upwards of page) of the 'vertical' segment, and the outlet 17 is provided at or near the alternate free end (to right of page) of the 'horizontal' segment.

The integration module 42 can be configured in different forms to achieve the same function in terms of receiving the flows of the dilution fluid 10 and the grinding media 15 into the flow pathway 20 for mixing/entrainment of the flows for transfer to the delivery pump 25. As shown in FIGS. 5 and 6, the introduction of flow Q2 of the dilution fluid 10 is made substantially tangentially with respect to a long or extended radiused bend 23 provided at a shallow angle α so as to assist in drawing flow Q5 of the grinding media 15 down from the second inlet 16 (receiving the grinding media flow Q5 vertically in the direction of gravity) and toward the outlet 17 which discharges the entrained media flow from the integration module 42 generally horizontally, or at about right angles to the direction of entry of the grinding media flow Q5 through the second inlet 16. For the configuration shown in FIGS. 5 and 6, a length 27 (in the form of about a 4-inch diameter pipe at about 300 mm in length) of a body 31 of the integration module 42 extends after the bend 23 before the outlet 17 and seeks to encourage steady flow conditions and reduce any turbulence that might be caused by the presence of the bend 23.

It will be understood that the configuration of the integration module 42 shown in FIGS. 5 and 6 is not essential, as a simple "T" joint connector can be used.

For the embodiment shown in FIG. 1, the reservoir 55 and the integration module 42 are fluidly connected by way of a flow pathway section 40 which houses or hosts the dilution pump 30 via conduit sections 40A, 40B in the manner shown in FIG. 1.

The integration module 42 is arranged, or configured as might be required, so as to be capable of receiving the grinding media 15 held or stored in a feed storage vessel (hereinafter, hopper 60). Grinding media 15 is fed into the integration module 42 via a conduit section 49 which is configured so as to fluidly connect or couple an outlet 62 of the hopper 60 with the second inlet 16 of the integration module 42.

The entrained media (mixing or mixed) is discharged from the integration module 42 to/toward the delivery pump 25 and received by its inlet 29. The integration module 42 is provided in fluid communication with the delivery pump 25 via the flow pathway 50 provided in the form of the conduit segment 50A. Downstream of and arranged in fluid communication with the delivery pump 25 is a further flow pathway 46 which is exemplified by a conduit segment 46A. The flow pathway 46 is configured so that the conduit segment 46A delivers entrained media to the delivery destination D on discharge from the delivery pump 25 (which could be, in some applications, elevated at a height of approximately 25 m). Higher elevations (of around 30 m, for example) could be possible by selecting appropriate media transfer or pump modules capable of higher transfer capacities. Practically, elevations of target delivery destinations are driven by the industrial application to hand and the usual equipment used in industry.

Figure 7:
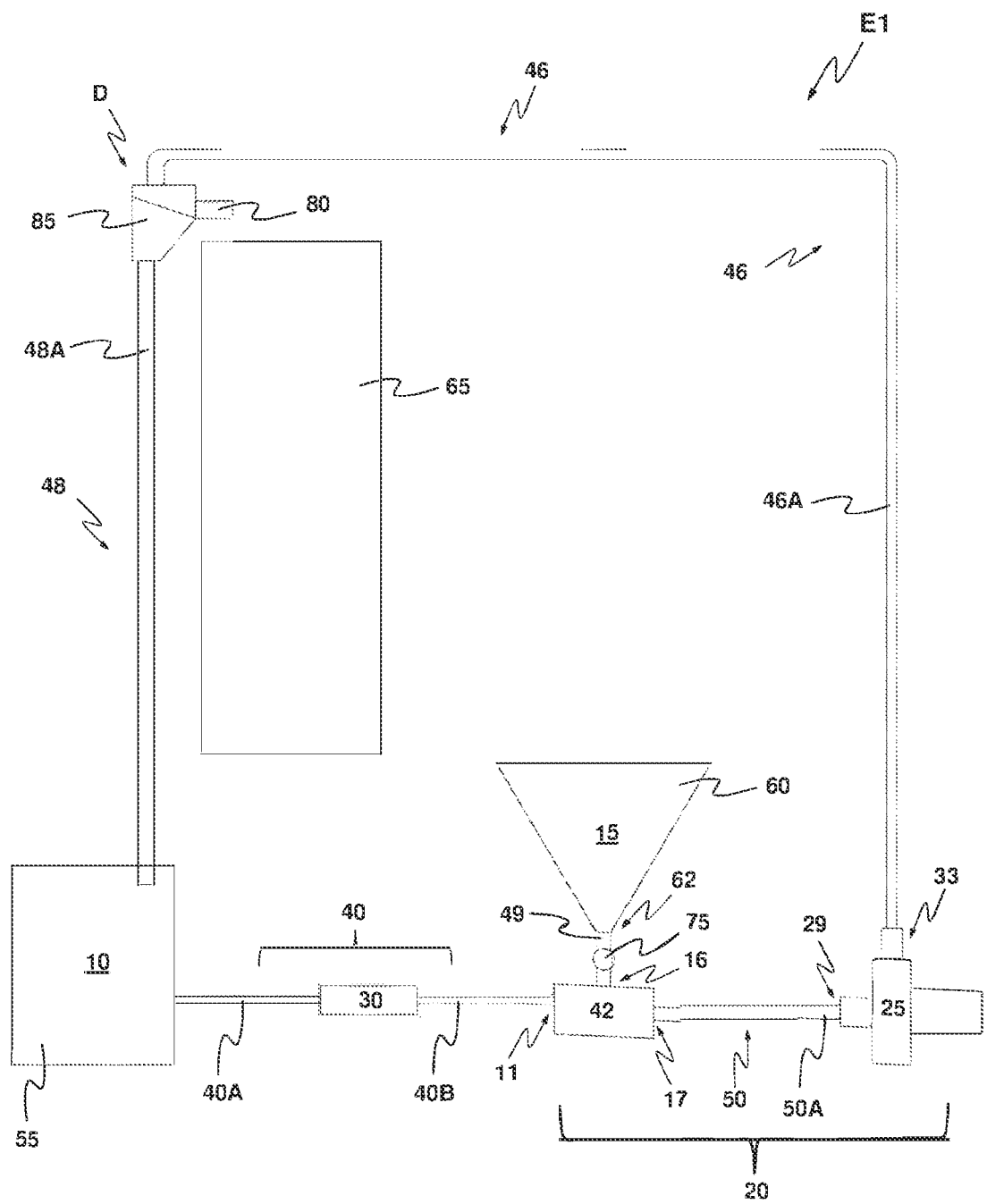
FIG. 7 shows a schematic view of an embodiment (E1) operable in accordance with the principles of the media handling system described herein.
Figure 8:
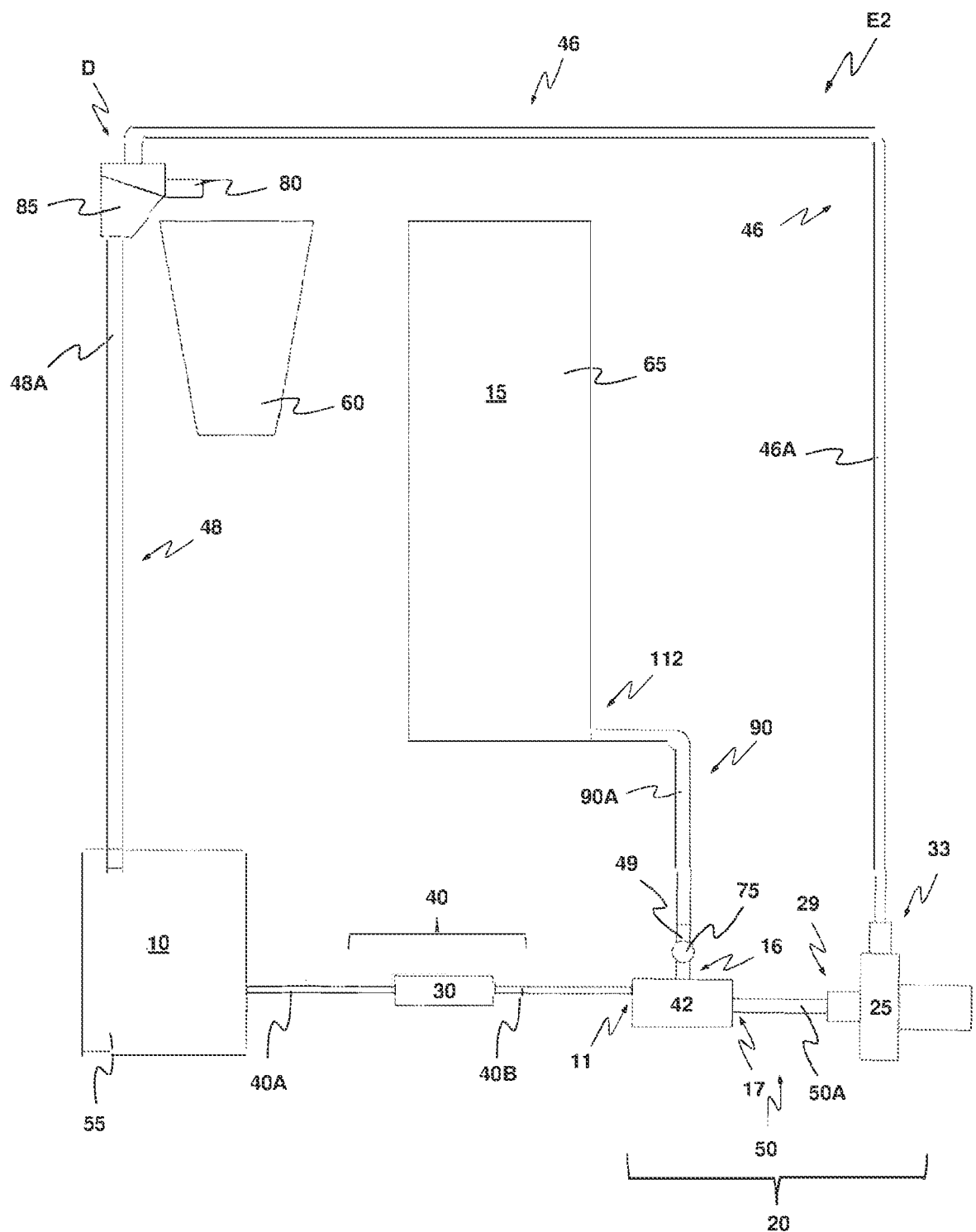
FIG. 8 shows a schematic view of an embodiment (E2) operable in accordance with the principles of the media handling system described herein.

The delivery destination D could be a terminal downstream opening of the conduit section 46A that discharges to, for example, a sieve (for separating/filtering constituent media discharged thereto), an inlet to a grinding mill or, in another implementation, a grinding media storage vessel/bin. In one form, the delivery destination D may comprise or output to a sieve 85 (shown in FIGS. 7 and 8) configured so as to filter the constituents of the entrained media received via the flow pathway 46 into respective streams—for example, a first stream which flows by way of a flow pathway 48 (exemplified by a conduit segment 48A) to another destination (for example, back to the reservoir 55 as shown in FIGS. 7 and 8), and a second flow/stream which, when the system 5 is operating in a 'charging' mode for charging a grinding mill 65 with grinding media 15, flows via the outlet 80 into the grinding mill 65.

In one form, the sieve 85 may be provided in the form of a dewatering module which is permanently installed overhead an intermediate storage hopper 60 (existing installation). In this form, the dewatering module receives the fluidised combined water-media flow from the system 5 during transfer duties involving draining of the grinding mill 65. The fluidised combined flow enters a cyclonic pressure reducing flow distributor which absorbs excess velocity of head from the delivery, providing a steady and homogenous flow to a dewatering sieve bend which dewaters the fluidised grinding media flow, delivering (based on available data, for example) approximately <5% moisture grinding media 15 to the intermediate storage hopper 60, and a fluid phase screen underflow.

Operation of one or both of the dilution 30 and delivery 25 pumps is by way of varying or modifying a respective operational condition or state (such as for example, increasing or decreasing their respective running speed which may be enabled by way of implementing a number of specific set-point parameters for each respective pump) of the relevant pump so as to vary the respective flow condition it aids in generating. This in turn influences (by virtue of the cooperative effect of the respective flows) the flow condition of the flow Q5 of grinding media 15 into the second inlet 16. In this manner, various of the attributes of the respective flow conditions in the system 5 can be modified as needed to so as to control and/or regulate the concentration of the grinding media 15 in the entrained flow Q3/Q4 for facilitating hydro-transport to a given selected delivery destination (D).

Attributes of the flow conditions generated by the operation of the dilution 30 and delivery 25 pumps may comprise any of the following: the pressure of the relevant flow, the density or specific gravity of the relevant flow, the mass flow rate of the relevant flow, the volumetric flow rate of the relevant flow, the velocity of the relevant flow. As will be described in detail below, a number of desired relationships or ratios between various of the flow attributes of the flow conditions of the flow of the dilution fluid 10 entering the first inlet 11, the entrained media entering or discharged from the delivery pump 25, and the flow of the grinding media 15 entering the second inlet 16, can be generated and or modified so as to be maintained by way of the operation of one or both of the delivery/dilution pumps 25, 30 for facilitating mixing/entrainment of the grinding media 15 with the dilution fluid 10 at desired conditions of flow velocity and density (or specific gravity) of the entrained media. Changes in the operation of dilution 30 and delivery 25 pumps may be informed on the determination of any of the attributes of the flow conditions (which determination could be based on physical sensing of one or more relevant flow attribute(s) and/or in conjunction with appropriate calculation methods/techniques using relevant fluid theory) in the system 5.

In one tested embodiment, the development of the desired relationship/ratios of flow pressures across the three branches (associated with inlets 11, 16, and outlet 17) of the integration module 42 may be informed by operation of the delivery pump 25, the dilution pump 30 and the head condition within the mill/hopper 60. Broadly, and in the tested embodiment, the pressures over the three branches are monitored and regulated as needed so that:

Suction (or negative pressure) is created at or near the grinding media 15 inlet 16 to the integration module 42. Such negative pressure is managed by control of the dilution pump 30 and the delivery pump 25 (as will be described below).

Balance between the inlets 11, 16 and the outlet 17 of the integration module 42 creates the desired delivery density and velocity of the entrained media. Such balance is managed by control of the dilution 32 and delivery 25 pumps (as will be described below).

A closed loop control arrangement is created allowing for a substantially automated response of the dilution 30 and delivery 25 pumps control to achieve the above, with changeable head conditions in the hopper/mill 60/65.

In achieving the above listed aims, sensing instrumentation (for example, any of: suitable pressure sensing transducer devices, flow rate sensing transducer devices, a monometer, a densitomer, Coriolis flow (rate) meter, magnetic flow meter, density meter (being of a nuclear, Coriolis, ultrasound, microwave, or gravitic type)) may be provided at any of the following locations/regions so as to create a suitable control arrangement/system for controlling operation of the dilution/delivery pumps 30, 25 in the manner required for realising the various relationships/ratios between the flow attributes of the flow conditions of the grinding media 15, the dilution fluid 10, and the entrained media (entering and as discharged from the delivery pump 25), for enabling appropriate mixing/entrainment: any location upstream or downstream of any of the dilution 30 or delivery 25 pumps, any pipe or conduit section/segment used to convey/deliver any of the dilution fluid 10 or grinding media 15 to or (entrained media flow) from the integration module 42 or the delivery pump 25, any inlet 11, 16 or outlet 17 (whether upstream or downstream thereof) of the integration module 42. Data from any of the sensing instrumentation may be used in conjunction with suitable/relevant fluid theory or experimentally obtained empirical relationships for determining any flow attribute for use in enabling any such control arrangement for managing the operation of the system 5.

As will be described below with reference to embodiments of the system 5 shown in FIGS. 2 and 3, and the control process diagrams shown in FIG. 4, in general operation in achieving the above listed aims, the delivery pump 25 is appropriately configured and controlled to produce enough velocity and head to transport the entrained media to the desired delivery destination (D) given the relevant system head and friction loss characteristics of the relevant duty application using set-points determined based on the system head characteristics for the delivery pipeline (based generally on the characteristics of the conduit segment 46A, such as, for example, length, bends, diameter and elevation of the delivery destination D, and other pipeline geometry etc). The dilution pump 30 is appropriately configured or 'tuned' (also using determined set-points, in that the running speed of the dilution pump 30 is generally set below that of the delivery 25) to ensure that its output does not completely satisfy the delivery pump's 25 demand. In this manner, suction at the inlet 16 where the flow of grinding media 15 enters the integration module 42 is created serving to draw or urge grinding media 15 into the system 5. In turn, changes to the dilution pump 30 output have an effect on the operating setpoints of the delivery pump 25 (providing higher/lower inlet head). For example, if operating the delivery pump 25 at a fixed speed, varying the dilution pump 30 outlet effectively influences the proportion of flow from the dilution fluid 10 through the first inlet 11 and the grinding media 15 through the second inlet 16—it is considered that increased dilution fluid 10 will result in reduced suction at the second inlet 16, and the inverse with reduced dilution fluid. Furthermore, control of the operation of the dilution pump 30 assists, at least in part, in controlling the various ratios of the flow attributes of the respective flow conditions of the dilution fluid 10 and the grinding media 15 as each flow progresses within the integration module 42. Control of the dilution 30 and delivery 25 pumps can be regulated through the closed loop control arrangement (using a programmable logic controller (PLC)) and pressure sensing instrumentation over the three branches 11, 16, 17 of the integration module 42.

In one example implementation of the principles described herein that has demonstrated good performance, the delivery pump 25 (provided in the form of a vortex pump) is configured so as to be operable at a generally constant or fixed operating speed level or set-point. This fixed/constant operating/running speed set-point is determined or informed by the relevant system head characteristic determined for the relevant transfer duty application. In practice, this determined running set-point speed is pre-programmed into the PLC which governs the operation of the system. Any such PLC may be provided (pre-programmed) with a number of selectable duty applications, each with a respective determined running set-point for operation of the delivery pump 25. In this implementation, a Coriolis mass flow meter is used as the primary sensing equipment and input which communicates with a suitably configured PLC in a closed feedback loop manner. The Coriolis mass flow meter provides all of the relevant data inputs, such as for example, flow rate, density, mass flow. The Coriolis mass flow rate meter is positioned at the delivery pump 25 (vortex pump) outlet 33 so as to directly measure the flow characteristic(s) of the entrained media flow as discharged from the outlet 33. The relevant PLC is also programmed with a desirous target concentration or density (specific gravity) of the grinding media 15 in the entrained media flow determined to be suitable for the relevant system head characteristic. In this example, the desirous target concentration/density/specific gravity is about 1,250 kg/m$^3$. In operation, with the delivery pump 25 operating at a fixed/constant running set-point, the dilution pump 30 (provided, in this implementation/example, in the form of a progressive cavity pump) output is controlled or regulated (by way of the operation of the pre-programmed PLC) in order to achieve the desired (or determined) or target transfer density setting on which the operation of the delivery pump 25 is based. Accordingly, in this example, the primary control input used by the PLC is the fluid density discharged from the outlet 33 of the delivery pump 25 as measured by the Coriolis mass flow rate meter.

In another tested example embodiment, control of delivery velocity (ie. Delivery velocity of the entrained media flow from the delivery pump 25 outlet 33 into the delivery pipeline provided in the form of the conduit segment 46A) has been found to be achieved by altering the delivery pump 25 speed, which, secondarily in turn, affects or influences the combined density/specific gravity of the entrained media as more grinding media 15 is drawn/urged from the mill/hopper 60, with generally no proportional increase in dilution fluid 10 from the dilution pump 30 should the operational state of the pump 30 be constant. The dilution pump 30 can be operated (or caused to be operated) so as to be responsive to any determined change in the operation of the delivery pump 25 so as to seek to maintain the desired density (concentration of grinding media) of the mixed/entrained flow. Likewise, altering the operational speed of the dilution pump 30 affects or influences the combined density/SG and, secondarily, the velocity/flow rate of the flow condition of the entrained media discharged from the delivery pump 25. In this manner, discharge from the delivery pump 25 is a product of the combination of the grinding media 15 (and its accompanying fluid drawn from the grinding mill/hopper which seeks to prevent air being introduced/drawn/sucked into the system 5) and the dilution fluid 10. In achieving this, head and velocity are configured at required set-points (each of which correspond with a respective operational state of the relevant pump) to overcome the determined system head and friction loss characteristics for the selected specific delivery pipeline (delivery to either mill, or hopper). These set-points, which are pre-programmed into a suitable PLC, can be undertaken through pilot testing and evaluation of the specific duty application (as discussed in relation to testing exercises below). An inherent element for consideration is the determination of the relevant system head and friction loss characteristics for the selected specific delivery pipeline so as to determine the required set-point levels for each of the pumps 30, 25.

In operating to achieve the aims listed above, a number of conditions have been found to assist in the generation and control/regulation of the relationships or ratios in respect of various flow attributes of the following flow conditions for establishing and/or maintaining the desired flow state: the flow condition of the dilution fluid 10 (Q2) entering the first inlet 11, the flow condition of the grinding media 15 (Q5) entering the second inlet 16, the flow condition of the entrained media (Q3) entering (at inlet 29) the delivery pump 25, and the flow condition of the entrained media (Q4) discharged (at outlet 33) from the delivery pump 25. In at least two example configurations shown in FIG. 2 (showing a test configuration in which grinding media 15 is removed from a storage hopper H1—analogous to feature 60 shown in FIG. 1) for use in charging a tower grinding mill T1—analogous to feature 65 shown in FIGS. 7 and 8—referred to as a 'recharge' duty) and FIG. 3 (showing an example configuration in which grinding media 15 is removed from a tower grinding mill T1 for transfer to storage hopper H1—referred to as a 'drain' duty), generation, control/regulation and maintenance of the conditions described below is enabled by way of a PLC being suitably programmed to be responsive (the diagrams of three control process used by the PLC are shown in schematic form in FIG. 4) to sensory inputs (from pressure transducer devices and used in conjunction with fluid theory as will be described below) in operating each of the dilution 30 and delivery 25 pumps in a desired manner for generating/maintaining the desired density/specific gravity of the entrained media for delivery at the desired flow velocity.

To assist in the discussion below, the following flows and their respective attributes are shown by way of examples shown in FIGS. 2 and 3 and referred to:

Flow Q2 (the flow of dilution fluid 10 entering the first inlet 11) having a flow pressure P2.

Flow Q5 (the flow of grinding media 15 entering the second inlet 16) having a flow pressure P5.

Flow pressure P3 of the flow Q3 of the entrained media entering the delivery pump 25.

Flow Q4 (the flow of entrained media discharged from the delivery pump 25) having a flow pressure P4.

Each of flows Q5 and Q4 have respectively a grinding media M volumetric flow rate (litres per second) component (with a specific density of about 4.1); being about 1.34 for each flow.

Flow Q5 comprises a wash water volumetric flow rate component W (litres per second) and combined volumetric flow rate W2 (litres per second) of the grinding media M and wash water components.

Flow Q4 comprises a wash water volumetric flow rate component W, a volumetric flow rate of the dilution fluid W1, and the combined volumetric flow rate W2 of the grinding media M and wash water components.

Flows Q2 and Q5 can also be represented in terms of respective mass flow rates QM2 and QM5. In effect, given that there is no solid matter in the dilution fluid flow Q2, its mass flow rate equates to its volumetric flow rate. However, the mass flow rate QM5 of the flow Q5 of grinding media 15 can be found from the data shown as being the volumetric flow rate M of the grinding media component multiplied by its specific density (of about 4.1) and added to the volumetric flow rate of the wash water component W—giving a mass flow rate QM5 of about 10.95 kilograms per second.

Figure 2:
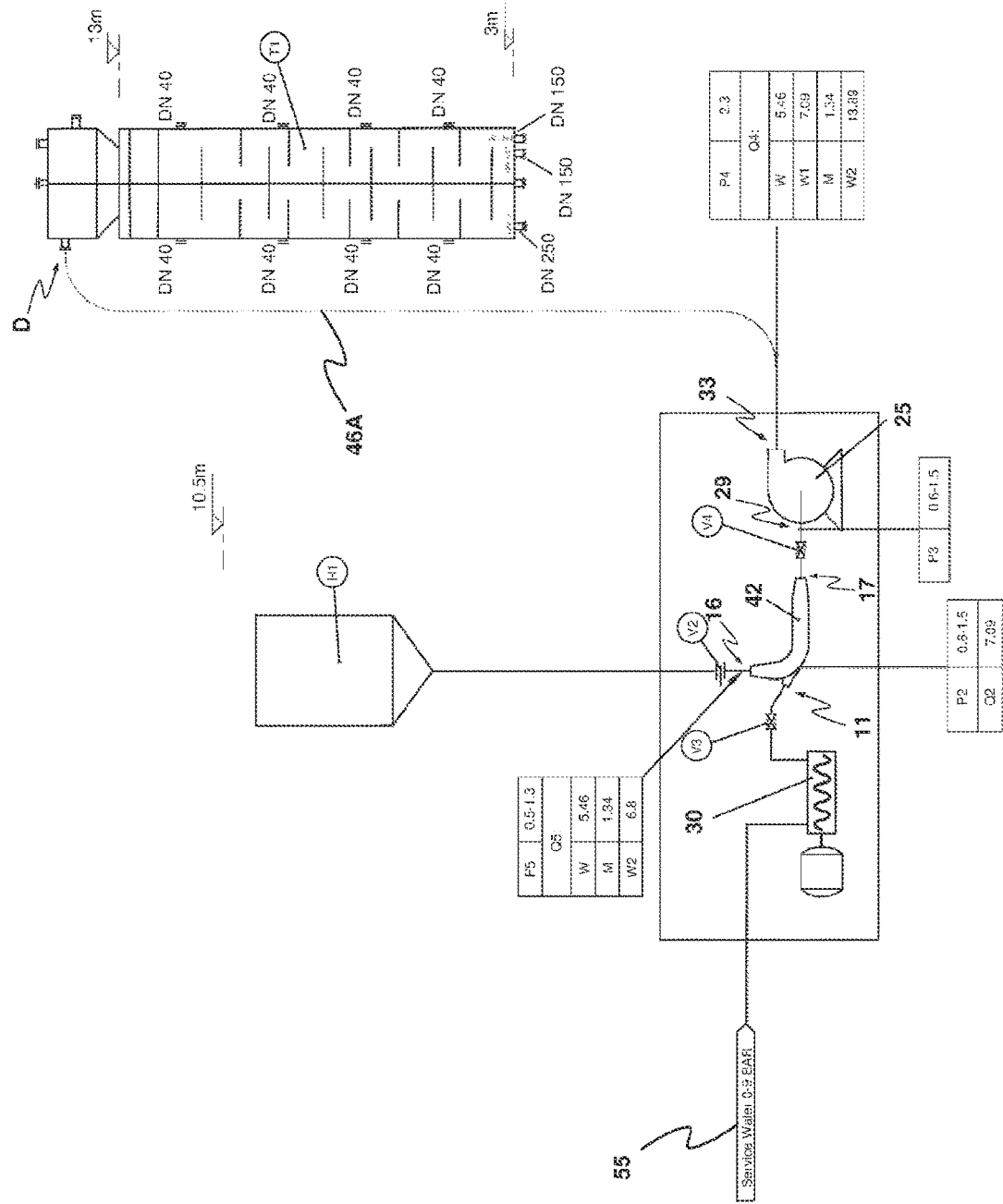
FIG. 2 shows a schematic view of another embodiment of a media handling system arranged in accordance with the principles described herein, in which the delivery destination is at an elevation of about 13 m and grinding media is transferred from a media hopper storage or holding vessel to a vertical orientated grinding mill.
Figure 3:
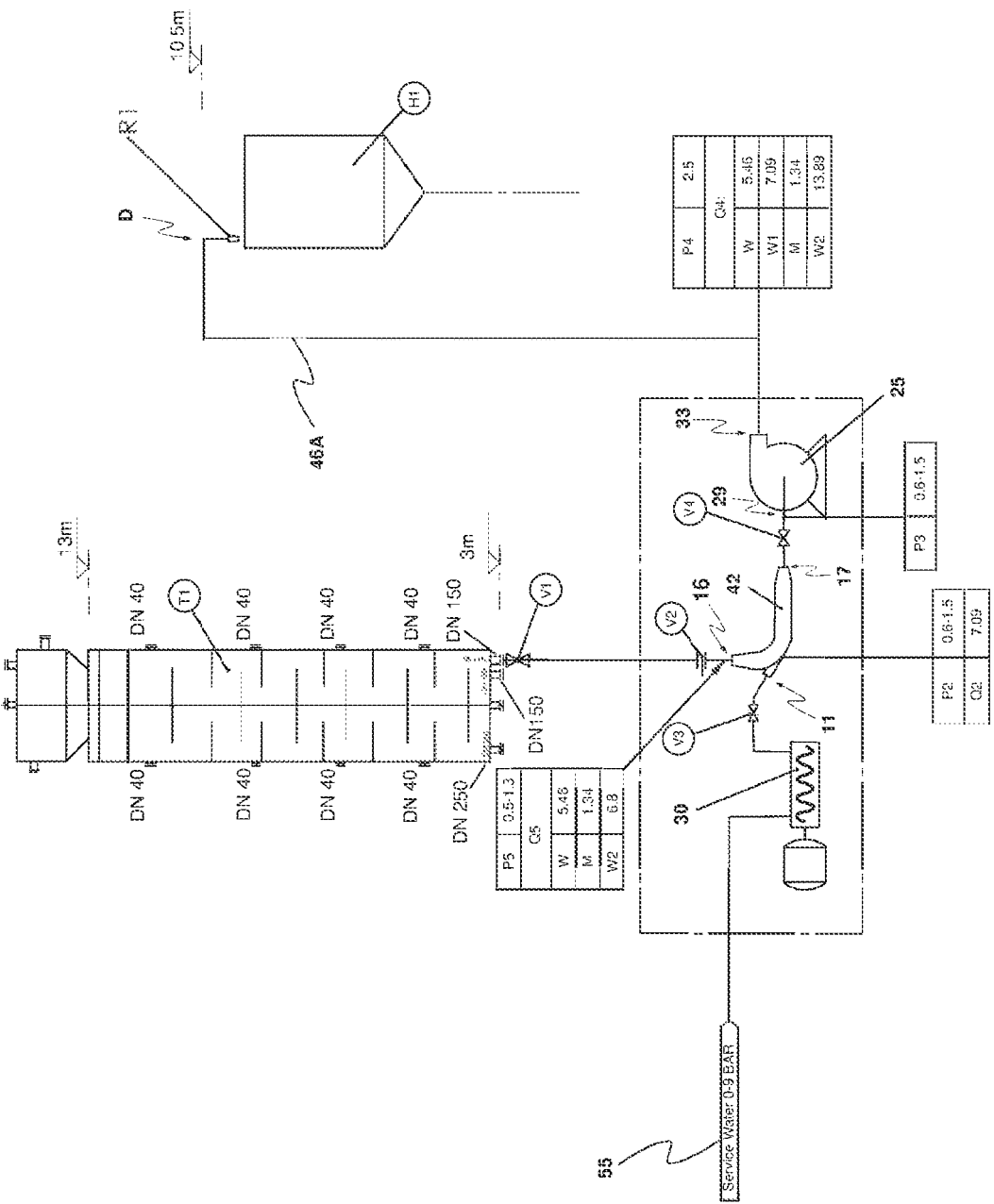
FIG. 3 shows a schematic view of another embodiment of a media handling system arranged in accordance with the principles described herein, in which the delivery destination is at an elevation of about 10.5 m and grinding media is transferred from a vertical orientated grinding mill to a media hopper storage or holding vessel.

It will be noted that the example data shown in FIGS. 2 and 3 are the same for both duty configurations shown. This is due to throttling of the media delivery for the 'drain duty' configuration (FIG. 3) to lower the system head characteristic so as to produce an artificial head to bring the system head characteristic closer to that of the 'recharge duty' (elevated head) configuration. This allows the system operational parameters to be closer.

Control valves are arranged in fluid communication with the first inlet 11 (for example, valve V3 shown in FIGS. 2 and 3 is a pinch/ball valve arranged upstream of the first inlet 11), the second inlet 16 (for example, valve V2 shown in FIGS. 2 and 3 is an electrically actuated knife gate valve arranged upstream of the second inlet 16—shown as valve 75 in FIG. 1), and the inlet 29 of the delivery pump 25 (for example, valve V4 shown in FIGS. 2 and 3 is a pinch valve arranged upstream of the inlet 29 of the delivery pump 25). In the testing embodiments developed/operated to date, the control valves are purely open or closed (ie. The control valves do not have partial control). In practice, valve control may be used in start-up, shut-down, and back-flush sequencing. In the testing embodiments, such operations are automated to give an operator push-button control.

With reference to the nomenclature shown in each of FIGS. 2 and 3, the following conditions/relationships of various attributes of the respective flow conditions of the various flows are sought to be enabled:

1. P2 will be managed so as to provide a pressure differential in relation to P5.
2. P2 and P4 is managed or regulated (by way of the relative operation of one or both of the dilution 30 and delivery 25 pumps in relation to the other) so as to maintain a differential relationship between P3 and P4 such that P3 is lower than P4.
3. P4 is managed to be greater than the determined duty system head characteristic and friction head losses.
4. The velocity of the discharge flow condition (Q4) of the entrained media from the delivery pump 25 is to be large enough to maintain a flow rate of from about 2 to about 3 m/see, despite system head loss and friction losses.
5. P4 and Q4 will be managed in response to the flow condition of the incoming dilution fluid to maintain a flow inducing differential between P3 and P4.
6. The ratio of certain flow attributes between the flow conditions of the grinding media (Q5) and the dilution fluid (Q2) entering the first inlet 11 (via the integration module 42) is managed by monitoring the density of flow Q5 so as to maintain a combined density/specific gravity of the entrained media to be in the range of from about 1.1 to about 1.6.

It will be appreciated that implementing actions that enable any of the above conditions may form steps or actions of a method for handling liquid and grinding media for mixing/entrainment purposes. Such methods may be enabled using any embodiment of the system 5 described herein. In providing any methods drawing from the presently described principles, each of the above items, as described in detail below, may be implemented as appropriate so that they are enabled and or managed by way of suitable actions or events as a given duty application may require. In one form, any such method for handling media may comprise any actions or events based on, or bringing effect to, the items described below, and can be managed by way of a suitable control system operable via suitable control electronics/circuitry (eg. A PLC module and supporting arrangement).

Item 1

The operation of one or both of the dilution 30 and delivery 25 pumps is managed (or caused to be managed) so that a pressure of the flow condition of the dilution fluid 10 discharged from the dilution pump 30 for entry through the first inlet 11 is or is caused to be generated, controlled/regulated, and or substantially maintained so as to generate, control/regulate, and or substantially maintain a pressure differential relative to a pressure of the flow condition of the grinding media 15 at or near where it enters the second inlet 16. In one implementation, the pressure differential is generated, controlled and/or maintained by way of the dilution pump 30 being appropriately operated or controlled, or caused to be operated/controlled (for example, by a suitably designed control system operated via a PLC). In various forms as may be required for a given duty application at hand, the pressure differential maybe negative or positive.

With reference to the example embodiments of the system 5 shown in FIGS. 2 and 3 and testing undertaken to date, the relevant duty application considered requires a negative pressure differential such that a pressure P2 of the flow condition of the dilution fluid 10 discharged from the dilution pump 30 is or is caused to be generated and or substantially maintained by way of the dilution pump 30 being appropriately operated or controlled, or caused to be operated or controlled, so as to generate and or substantially maintain the pressure P2 so as to be less than a pressure P5 of the flow condition of the grinding media 15 at or near where it enters the second inlet 16. A control diagram reflecting management of this condition is shown in FIG. 4 and labelled "A". In this manner, a pressure gradient can be generated and or substantially maintained for assisting in inducing a flow of the grinding media 15 into/through the second inlet 16 for mixing/entrainment with the dilution fluid 10. Such a pressure gradient may be referred to as a 'negative pressure differential'.

Without being bound by theory and/or testing data gathered to date, in generating and or substantially maintaining either a negative or positive pressure differential between the pressure P2 of the flow condition of the dilution fluid 10 (Q2) at or near where it enters the first inlet 11 and the pressure P5 of the flow condition of the grinding media 15 (Q5) at or near where it enters the second inlet 16, the pressures of the respective flows may be as follows:

the pressure P2 of the flow Q2 is managed so as to be from about 0.6 Bar to about 1.5 Bar, and the pressure P5 of the flow Q5 is managed so as to be from about 0.5 Bar to about 1.3 Bar.

The actual pressure of either flow, and the ratio between them, will depend on the duty application (for example, requiring consideration of the relevant determined system head and friction loss characteristics) the system 5 is configured for and the static fluid head at or near the second inlet 16.

In other duty applications a positive pressure differential may be advantageous. In such scenarios, the pressure P2 of the flow condition of the dilution fluid 10 discharged from the dilution pump 30 may be managed by way of the dilution pump 30 being appropriately operated or controlled, or caused to be operated or controlled, so as to generate and or substantially maintain a pressure that is greater than the pressure P5 of the flow condition of the grinding media 15 (Q5) at or near where it enters second inlet 16. In using such a pressure profile or gradient, it is considered that where respective flows of the dilution fluid 10 and the grinding media 15 engage for mixing/entrainment purposes in the integration module 42, a dynamic pressure environment has the potential to be created to assist in the induction and mixing/entrainment process/event.

Under some high head scenarios in the hopper/mill 60/65, it is envisaged that the dilution pump 30 will likely be required to provide less flow/head.

Item 2

With reference to FIGS. 2, 3 and 4 (particularly, the control diagram labelled 'B'), operation of one or both of the dilution 30 and delivery 25 pumps is managed (or caused to be managed) so that a pressure P2 of the flow condition of the dilution fluid 10 (Q2) discharged from the dilution pump 30 and the pressure P4 of the flow condition of the entrained media discharged from the delivery pump 25 (Q4) via operation of the respective pumps 30, 25 in, for example, a bilateral or relative manner informed by the operation of the other, are caused to be controlled and or regulated so that a substantially negative relationship is generated, controlled/regulated, and or substantially maintained between the respective pressures of the respective flow conditions of the entrained media entering (P3) and discharged (P4) from the delivery pump 25. In this manner, the negative relationship involves the pressure P3 of the flow condition of the entrained media (Q3) entering the delivery pump 25 being less than the pressure P4 of the flow condition of the entrained media (Q4) discharged from the delivery pump 25. Generation and or control/regulation of such negative relationship operates to maintain a desired performance profile of the delivery pump 25 for achieving and or controlling/regulating for maintaining a desired discharge flow velocity of the entrained media from the delivery pump 25 despite the relevant determined system head and friction loss characteristic(s) of the system as designed or determined for the relevant duty application.

Item 3

One or both of the dilution 30 and delivery 25 pumps are configured so as to be operable (or caused to be operable) for generating, controlling/regulating, and or maintaining a pressure P4 of the flow condition of the entrained media (Q4) discharged from the delivery pump 25 so as to be greater than any pressure caused due to the relevant duty system head and friction head loss characteristics. The skilled reader will appreciate that the range of the duty system head characteristic is a function of the length of the pipeline (which drives the friction head loss component created as a result of media rubbing against the internal wall of the conduit/pipe as the media moves there through) and the static head requirement (this being the vertical lift or height that the entrained media is required to travel as it moves through the conduit/pipe system) toward the delivery destination D.

Item 4

One or both of the dilution 30 and delivery 25 pumps are configured so as to be operable or caused to be operable for generating, controlling/regulating, and or substantially maintaining a volumetric flow rate of the flow condition of the entrained media (Q4) discharged from the delivery pump 25 that is sufficient for enabling a velocity of the flow Q4 of the entrained media to be from about 2 to about 3 metres per second notwithstanding losses caused due to the relevant determined system head and friction characteristics for the relevant duty application.

In the examples shown in FIGS. 2 and 3 and based on testing undertaken do date using a piping/conduit network having about 78 mm bore extending a delivery line to about 10.5 metres, the density or specific gravity of the flow condition of the entrained flow (Q4) is caused to be generated and or substantially maintained to be from about 1.1 to about 1.6. In this example, the delivery pump 25 is configured operable or caused to be operable so as to generate and or substantially maintain a volumetric flow rate of about 13.89 litres per second which provides for a flow velocity of the flow condition of the entrained media to be in the range from about 2 to about 3 metres per second. It will be appreciated that changes in the specification of the relevant pipe/conduit network/assembly and elevation of the desired delivery destination D will influence the flow attributes (pressure, density, mass and/or volumetric flow rates, flow velocity) needed to maintain the required vertical lift/elevation required of the flow condition of the entrained media (Q4) for effective hydro-transportation/conveyance of the grinding media 15.

Item 5

The delivery pump 25 can be configured so as to be operable or caused to be operable so that any of the pressure, density, mass flow rate and/or volumetric flow rate of the flow condition of the entrained media (Q4) discharged from the delivery pump 25 is variable (for example, changed or varied as required by way of changing one or more operating characteristic(s) of the delivery pump 25, eg. Its operational running speed) as might be needed in response to variations (eg. As might be determined due to physical sensing and/or calculable assessment) to any of the pressure, density, mass flow rate and volumetric flow rate of the flow condition of the dilution fluid 10 (Q2) discharged from the dilution pump 30, in order to generate, control/regulate, and or substantially maintain a differential between the pressure P3 of the flow condition of the entrained media (Q3) at or near the inlet 29 of the delivery pump 25 and the pressure P4 of the flow condition of the entrained media (Q4) discharged from the delivery pump 25 that facilitates/enables drawing/urging of the flow of the grinding media 15 through the second inlet 16.

Having regard to the examples shown in FIGS. 2 and 3, a negative pressure differential is generated, controlled/regulated, and or substantially maintained between the inlet and discharge sides of the delivery pump 25 for assisting in the drawing/urging of the flow of the grinding media 15 through the second inlet 16. In these examples, the pressure P4 and volumetric flow rate of the flow condition of the entrained media Q4 discharged from the delivery pump 25 is managed (or caused to be managed) by way of operation of the delivery pump 25 by monitoring/assessment of the pressure P2 and flow rate (one or both of the mass flow rate and volumetric flow rate) of the flow condition of the dilution fluid 10 (Q2) entering the first inlet 11 for maintaining the pressure P3 of the flow condition of the entrained media (Q3) entering the delivery pump 25 to be less than the pressure P4 of the flow condition of the entrained media (Q4) discharged from the delivery pump 25. In this manner, a flow inducing differential enabling the introduction of the flow Q5 of grinding media 15 into/through the second inlet 16 can be maintained.

With specific reference to the data provided with the examples shown in FIGS. 2 and 3, the delivery pump 25 can be operated or caused to be operated, based on an assessment of any of the pressure, density, and mass/volumetric flow rate of the flow condition of the dilution fluid 10 (Q2) as determined by way of suitable sensing instrumentation in respect of the physical flow condition of the dilution fluid 10 and/or any relevant performance characteristics of the dilution pump 30 (for example, its running/operational speed) and/or in conjunction with relevant fluid theory using relevant calculation methods or techniques, so that the pressure P4 of the flow condition of the entrained media (Q4) discharged from the delivery pump 25 is about 2.3 Bar (such pressure level determined by testing to be suitable for moving the flow of the entrained media having a density or specific gravity of from about 1.1 to about 1.6 at a flow velocity of from about 2 to about 3 metres per second, equating to about a volumetric flow rate of about 13.89 litres per second in respect of a pipe/conduit having about a 78 mm bore). For the example shown, the pressure P4 is greater than the pressure P3 of the flow condition of the entrained media (nominally from about 0.6 Bar to about 1.6 Bar) at or near the inlet 29 of the delivery pump 25. The pressure P2 of the flow condition of the dilution fluid 10 (Q2) entering the first inlet 11 is less than about 2.3 Bar (or, based on the learnings from testing, from about 0.6 Bar to about 1.6 Bar) when having a density or specific gravity of about 1.0 (for the case of substantially clear water, but it will be appreciated that situations may occur where recirculated water or used process water is reused in which respective density or specific gravity values could be as high as about 1.4) and a volumetric flow rate of about 7.09 litres per second. In this example, the flow condition of the induced flow q5 of grinding media 15 through the second inlet 16, due to the pressure differential (ie. P3<P4) between the inlet 29 and discharge 33 sides of the delivery pump 25, is considered to comprise: a volumetric flow rate of about 6.5 litres per second, a flow pressure P5 of from about 0.5 Bar to about 1.3 Bar, a volumetric flow rate of about 1.34 litres per second (the grinding media 15 having a specific density of about 4.1), and a volumetric flow rate of accompanying water of about 5.46 litres per second.

Accordingly, affirmative monitoring/assessment of the flow condition of the dilution fluid 10 entering the first inlet 11 and the entrained media flow Q4 discharged from the delivery pump 25 assists in informing a responsive action to be taken in respect of the delivery pump 25 and or the dilution pump 30, as might be required, for managing the differential between the pressure P3 of the flow condition of the entrained media entering the inlet 29 of the delivery pump 25 and the pressure P4 of flow condition of the entrained media being discharged therefrom that facilitates/enables drawing or urging of the flow Q5 of the grinding media 15 through the second inlet 16.

Item 6

By direct monitoring, or by indirect assessment or determination, of one or more flow attributes (for example, flow pressure, the density or specific gravity) of the flow condition of the grinding media 15 flow (Q5) entering the second inlet 16, operation of one or both of the dilution 30 and delivery 25 pumps can be managed so that a ratio (eg. A desired or target) of one or both of the mass flow rate and the volumetric flow rate of the flow condition of the grinding media 15 flow Q5 entering the second inlet 16 with respect to the mass flow rate and volumetric flow rate of the flow condition of the dilution fluid 10 flow Q2 entering the first inlet 11 is or is caused to be generated, controlled/regulated, and or substantially maintained for drawing or urging of the flow of the grinding media 15 through the second inlet 16 for generating, controlling/regulating, and or substantially maintaining a density or specific gravity of the entrained media to be from about 1.1 to about 1.6. In attending to this condition, the density of the flow of the grinding media 15 entering the second inlet 16 is monitored, and the dilution pump 30 being operated accordingly, using the control arrangement shown in FIG. 4 and labelled 'C'.

Based on testing and analysis work to date, the ratio (eg. A desired or target) of the mass flow rate of the flow condition of the grinding media 15 entering the second inlet 16 with respect to the mass flow rate of the dilution fluid 10 entering the first inlet 11 provides advantage in being from about 0.2 to about 1.6. Having regard to the specific example shown in FIGS. 2 and 3, the ratio (eg. a desired or target) is about 1.54 based on the data shown. In the latter example, the mass flow rate QM5 of the flow condition of the grinding media 15 (Q5) entering the second inlet 16 is determined to be about 10.95 kilograms per second based on a liquid component having a mass flow rate of about 5.46 kilograms per second, and a grinding media 15 component (having a specific density of about 4.1) flowing at a volumetric flow rate of about 5.49 kilograms per second. The mass flow rate QM2 of the flow condition of the dilution fluid entering the first inlet 11 is about 7.09 kilograms per second of substantially clear water (having a density or specific gravity of about 1.0), thereby providing the ratio of the mass flow rates of both flow conditions (QM5/QM2) of about 1.54. Of course, the relevant mass flow rate ratio (QM5/QM2) is subject to the condition of the water/liquid used as the hydro-transport component (it will be appreciated that situations may occur where recirculated water or used process water is used in which respective density or specific gravity values could be as high as about 1.4).

In the same examples, the ratio of the volumetric flow rate (Q5) of the flow condition of the grinding media 15 entering the second inlet 16 with respect to the volumetric flow rate of the flow condition of the dilution fluid 10 entering the first inlet 11 is about 0.96, or approaching but less than unity.

Accordingly, without being bound by data obtained to date, learnings from the testing exercises suggest that there can be advantage in a pressure and a volumetric flow rate of the flow condition of the dilution fluid 10 (Q2) entering the first inlet 11 being caused to be generated and maintained so as to be from about 0.6 to about 1.5 Bar and about 7.09 litres per second respectively via operation of the dilution pump 30 in response to changes (determined by way of physical sensing instrumentation and or in conjunction with calculation methods/techniques) in the flow condition (for example, any of the pressure, density, specific gravity, mass flow rate, volumetric flow rate) of the grinding media 15 entering the second inlet 16 for generating and maintaining a combined density or specific gravity of the flow condition of the flow of entrained media to be from about 1.1 to about 1.6 while:

(a) the ratio (QM5/QM2) of the mass flow rate QM5 of the grinding media 15 flow condition entering the second inlet 16 with respect to the mass flow rate QM2 of the dilution fluid 10 flow condition entering the first inlet 11 is caused to be generated and maintained by way of the operation of one or both of the dilution 30 and delivery 25 pumps so as to be from about 0.2 to about 1.6 (or in one specific example, about 1.54); and (b) the ratio (Q5/Q2) of the volumetric flow rate Q5 of the grinding media 15 flow condition entering the second inlet 16 with respect to the volumetric flow rate Q2 of the dilution fluid 10 flow condition entering the first inlet 11 is caused to be generated and maintained by way of the operation of one or both of the dilution 30 and delivery pumps 25 so as to be approaching but less than unity (or, in one specific example, about 0.96).

In working to achieve the above conditions, various control arrangements can be developed that use physically sensed information (eg. flow pressures) in conjunction with fluid theory calculations. For example, as the flow condition of the dilution fluid 10 (in terms of mass and volume) discharged from the dilution pump 30 will be a known value (for example, determinable from use of a positive displacement pump flow being proportional to pump operational speed), by using the Darcy-Weisbach equation flow attributes (for example, density/specific gravity values) can be determined for the flow condition of the flow Q5 of the grinding media 15 entering the second inlet 16 by calculation to seek to optimise the performance of the dilution 30 and delivery 25 pumps for delivery purposes for any given system head and associated relevant friction losses characteristic.

To elaborate on the variables of specific gravity, flow, velocity and head, Darcy's equation provides:

$$\text{Head loss, } S(h) = f_D \cdot \frac{L}{D} \cdot \frac{(v)^2}{2G}$$

where $f_D$ is the friction factor, L is the pipe length, v is the fluid velocity, $f_D$ is a function of Reynolds number (which is a ratio of density, viscosity, velocity), pipe surface roughness, and diameter. Without being bound by theory, since density is the main variable within a narrow band of velocity and viscosity, and with any relevant pipe characteristic(s) remaining constant, it is possible to monitor the density changes using pressure sensor(s)/transducer(s), and to control/regulate such density changes by way of the introduction of the dilution fluid 10 through the first inlet 11 (ie. by way of operation of the dilution pump 30). In this manner, a control length of a utilised delivery pipe/conduit, suitably equipped with differential pressure sensors, can be configured so as to sense the changes in combined flow density as a relative value for input to a control system using a PLC, thereby providing a 'closed loop' control arrangement/system for controlling operation of the dilution pump 30 (for example, the pump's operational speed). Furthermore, power, which is proportional to the flow and pressure differential across the inlet and discharge sides of the pump, can be considered as a secondary indicator of performance for, for example, a fixed pipework system. It will be appreciated that the monitoring of the density or specific gravity of the flow condition of the grinding media could be achieved directly using fluid density sensing equipment as opposed to the calculation based approach described here.

While not being bound by testing data and observations to date, the rate of the entrained media delivery at the delivery destination D may be constrained by the pipe/conduit diameter, flow velocity, and combined density (or specific gravity) of the flow of the entrained media. The latter two attributes may have the effect of creating excessive pipe wear if their respective values are too high. In some operational situations, the system 5 can be operated so that the operation of the dilution pump 30 and delivery pump 25 are capable of achieving a specific gravity of entrained media so as to be within a range of from about 1.1 to about 1.6 SG while providing for a transport velocity (of entrained media) of from about 2 to about 4.5 m/s. As noted herein, these attributes are controlled by the operations of the dilution pump 30 and delivery pump 25 through interactions of the respective flow conditions they generate (within the integration module 42), which is the means of creating the necessary flow relationships/ratios between grinding media 15 and the dilution fluid 10 to facilitate hydro-transport at the optimal conditions of flow velocity and density (or specific gravity).

Thus, operation of the respective flow conditions generated by the dilution pump 30 and the delivery pump 25, with selective control which is, at least in the prototype systems developed and tested to date, automated through closed loop control with the PLC based on the monitoring (and/or with informed calculation) of the relevant pressures over the first 11, second 16 inlets (and the outlet 17 of the integration module 42), and the inlet 29 and discharge outlet 33 of the delivery pump 25, enables the desired target density or specific gravity of the entrained media to be achieved and maintained for providing for effective transport/conveyance of the grinding media 15 at the target flow velocity (of the entrained media) to counter the adverse effects of the relevant determined system head and friction losses characteristic for the selected duty cycle/application.

As noted above, examples of existing technologies in this niche area of technology are described in international patent publication (of the Patent Cooperation Treaty) WO2011/072324 (WO'324) and United States patent publication US 2021/0094039 (US'039). The technologies taught in WO'324 and US'039 lack any ability/sophistication to control/regulate the development/maintenance of the combined fluid density (grinding media concentration) needed for delivery/supply of the mixed flow to a selected delivery destination.

WO'324 discloses an apparatus for delivering grinding media to a grinding mill. WO'324 teaches the use of a separate (eductor) unit for use in mixing/entrainment of grinding media with water as an initial and separate/distinct process. The mixing/entrainment step relies on the performance of a water pump and specific configurations of the disclosed eductor unit. Control of the eductor unit is mechanically complex in that it is governed by nozzle ratios and the pressure/flow ratios produced by motive water delivery (i.e. water delivered by the water pump to the eductor chamber). Once the grinding media is mixed/entrained, the mixtures are conveyed to a slurry pump box and fed to a slurry pump for transfer/delivery to a grinding mill. In substance, WO'324 teaches an open circuit multistep arrangement involving separate and specific processes: (i) a first step having an objective of mixing/entrainment grinding media with water, followed by (ii) delivery of the mixed media.

WO'324 teaches no operational relationship between the mixing/entrainment and delivery steps, and therefore fails to recognise the advantages that can be gained by such an arrangement as inherent in the principles described herein. Given the mechanical basis on which the technology taught in WO'324 relies, WO'324 lacks any need for control logic to manage the components in any interoperable manner and thus with respect to grinding media transfer does not have the capability to simultaneously variably control the overall open circuit multistep system performance, rather the necessity to independently control each stage respectively.

Similar comments are relevant for the technology described in US'039. US'039 discloses a feed system for feeding grinding bodies to a vertical mill and includes a pumping unit for sucking a propulsion liquid from a source and for supplying the liquid under pressure into a discharge tube. US'039 teaches use of a mechanical based feed screw for introducing grinding media into a pipeline that is then gravity fed into a hydro-transport pipeline. The flow of the grinding media is controlled by the specification and operational parameters of the feed screw. The feed screw is a dry process, feeding dry media from a hopper into the hydro-transport stream. The impact of such feed screw performance has no relation to the output of the motive pump (water delivery). In effect, US'039 teaches a force-fed introduction of the grinding media into the hydro-transport stream. The motive pump which delivers water to the transfer pipeline is set to operate to deliver a suitable head/velocity to transport the grinding media to the delivery destination. As with the technology described in D1, the introduction of grinding media and the delivery stages disclosed in US'039 are separate and are taught as operating independently of each other. US'039 does not teach any control logic to manage the relevant components in any interoperable matter and therefore with respect to grinding media transfer does not have the capability to simultaneously variably control the overall system performance, rather the necessity to independently control each stage respectively.

In stark contrast to the technologies taught in WO'324 and US'039, the presently described principles find advantage in that the flows generated by the dilution (30) and delivery (25) pumps operate to cooperate with one another for drawing/urging grinding media into the fluid circuit of the system (5) in order to control/regulate the development/maintenance of the combined fluid density (grinding media concentration) needed for successful delivery/supply of the mixed flow to a selected delivery destination. This level of sophistication is not taught or recognised in WO'324 or US'039 (indeed, both WO'324 and US'039 teach away from this level sophistication). As such, the technologies described in WO'324 and US'039 lack advantage over the principles described herein as exemplified in the system 5.

A number of embodiments availing of the principles of the system 5 described herein are described below which draw upon various of the features and structure described herein. For each embodiment, where considered reasonable, reference numerals are retained for analogous features for conciseness of explanation.

Charging Grinding Media to a Grinding Mill

Embodiment E1

FIG. 7 shows an embodiment E1 drawing upon the principles of the system 5 described above, configured for the purpose of charging grinding media 15 to a vertically aligned/orientated (tower) grinding mill 65. In the form described, the embodiment E1 is operable in two modes of operation: an 'idling' mode, which serves to prevent air being introduced into the flow pathway 20 so as to keep the system 'primed' ready for undertaking a 'charging' process; and a 'charging' mode in which the grinding media 15 is introduced into the grinding mill 65 via an outlet 80 (see FIG. 7).

In another embodiment (described below as Embodiment E2 shown in FIG. 8), the principles described herein are implemented for use in providing a media handling system operable in a 'discharging' mode in which grinding media already present in a grinding mill (65) can be 'discharged' or drained therefrom and delivered to a suitable storage vessel or bin separate of the grinding mill via the sieve 85 and outlet 80.

Idling Mode

A supply of liquid media in the form of a storage or holding vessel (hereinafter, reservoir 55) is filled with the dilution fluid 10 (as noted, typically a liquid water-clear water or reused service or process water—or a slurry). Dilution fluid 10 from the liquid media supply (ie. reservoir 55) is transported firstly into the integration module 42 using suction provided by the dilution pump 30 provided upstream of the integration module 42 (ie. drawing the dilution fluid 10 from the reservoir and discharging to the integration module 42). The dilution fluid 10 is transported for discharge to the integration module 42 via the flow pathway section 40 which, as seen from FIG. 7, is provided in the form of conduit elements 40A, 40B. The flow pathway section 40 therefore houses or hosts the dilution pump 30 in the manner shown in FIG. 7.

Feeding into the integration module 42 is the grinding media 15 supply which is stored in the hopper 60. A head of water or other liquid fluid may be used in the hopper 60 to prevent ingress of air into the flow pathway 20 or overarching system. The outlet 62 of the hopper 60 feeds into the integration module 42 via a conduit element 49. Between the outlet 62 of the hopper 60 and the inlet 16 of the integration module 42, a valve 75 is located within conduit segment 49. In the 'idling' mode of embodiment E1, the valve 75 is closed preventing grinding media 15 from entering the integration module 42 from the hopper 60.

In the 'idling' mode of operation for embodiment E1, dilution fluid 10 is drawn or urged/sucked, with the assistance of the delivery pump 25 from the reservoir 55 through the flow pathway section 40 so that the minimum flow requirements/demands of the delivery pump 25 are met. Dilution fluid 10 received by the delivery pump 25 is discharged to the flow pathway 46 and delivered to the sieve 85. Underflow from the sieve 85 is returned to the reservoir 55 by way of the conduit element 48A of the flow pathway section 48.

Media 'Charging' Mode

In the 'charging' mode of embodiment E1, dilution fluid 10 is provided to the integration module 42 via the dilution pump 30 via the flow pathway 40, and grinding media 15 is provided to the integration module 42 from the hopper 60 via the opened valve 75. The delivery pump 25 in conjunction with the dilution pump 30, with the dilution pump 30 being tuned/configured to not completely meet the flow requirements/demands of the delivery pump 25, cooperate to establish, and seek to maintain, a pressure differential which creates sufficient suction via the flow pathway 50 for drawing/urging grinding media 15 into the integration module 42. Thus, the volume of dilution fluid 10 provided by the dilution pump 30 is configured operable so as to be less than the volume of fluid required by the suction of the delivery pump 25, thereby causing drawing/urging of the grinding media 15 from the hopper 60 into the integration module 42.

In accordance with the principles described above, the entrained mixture of grinding media 15 and dilution fluid 10 is transported by suction from the integration module 42 to the inlet 29 of the delivery pump 25 via the flow pathway section 50. Entrained media is discharged from the delivery pump 25 and transported/conveyed to the sieve 85 located at the top of the grinding mill 65 (as shown in FIG. 2) via the flow pathway 46. As foreshadowed above, the entrained media is separated in the sieve 85 whereby the constituent grinding media 15 is discharged via outlet 80 into a grinding or similar chamber of the grinding mill 65, and the dilution fluid 10 is returned to the reservoir 55 via the flow pathway section 48.

Embodiment E2

FIG. 8 shows another embodiment E2 drawing upon on the principles of the system 5 described above. Many of the components used in the above-described embodiment E1 are retained. As such, relevant identifying reference numerals are also retained for ease of explanation.

As with embodiment E1, in the 'idling' mode of operation, the valve 75 is closed and sufficient volumetric dilution fluid 10 to meet the suction requirements/demands of the delivery pump 25 is provided/administered by the dilution pump 30.

When embodiment E2 is switched to the 'charging' mode of operation, the valve 75 is opened and the volumetric flow of dilution fluid 10 from the dilution pump 30 to the integration module 42 is reduced, thereby facilitating drawing or suction (by the creation and maintenance of a sufficient pressure differential) of the grinding media 15 from the hopper 60 into the integration module 42. Thereafter, the operation of embodiment E2 is substantially in keeping with that described for embodiment E1.

Any of the embodiments of the system 5 described herein may be configured so as to be supported on or by way of a portable or transportable structure, such as for example, a "skid" structure for portability/transport purposes. An example of such an arrangement is shown in FIGS. 17 to 20, and described in more detail below.

Experimental/Testing Data

The substance of the principles of the system 5 described above have been learned from initial testing exercises as outlined below. FIGS. 9 to 16 present information relating to the testing carried out to date. The general configuration of the testing configurations resembles those shown in FIGS. 1 to 3.

Figure 9:
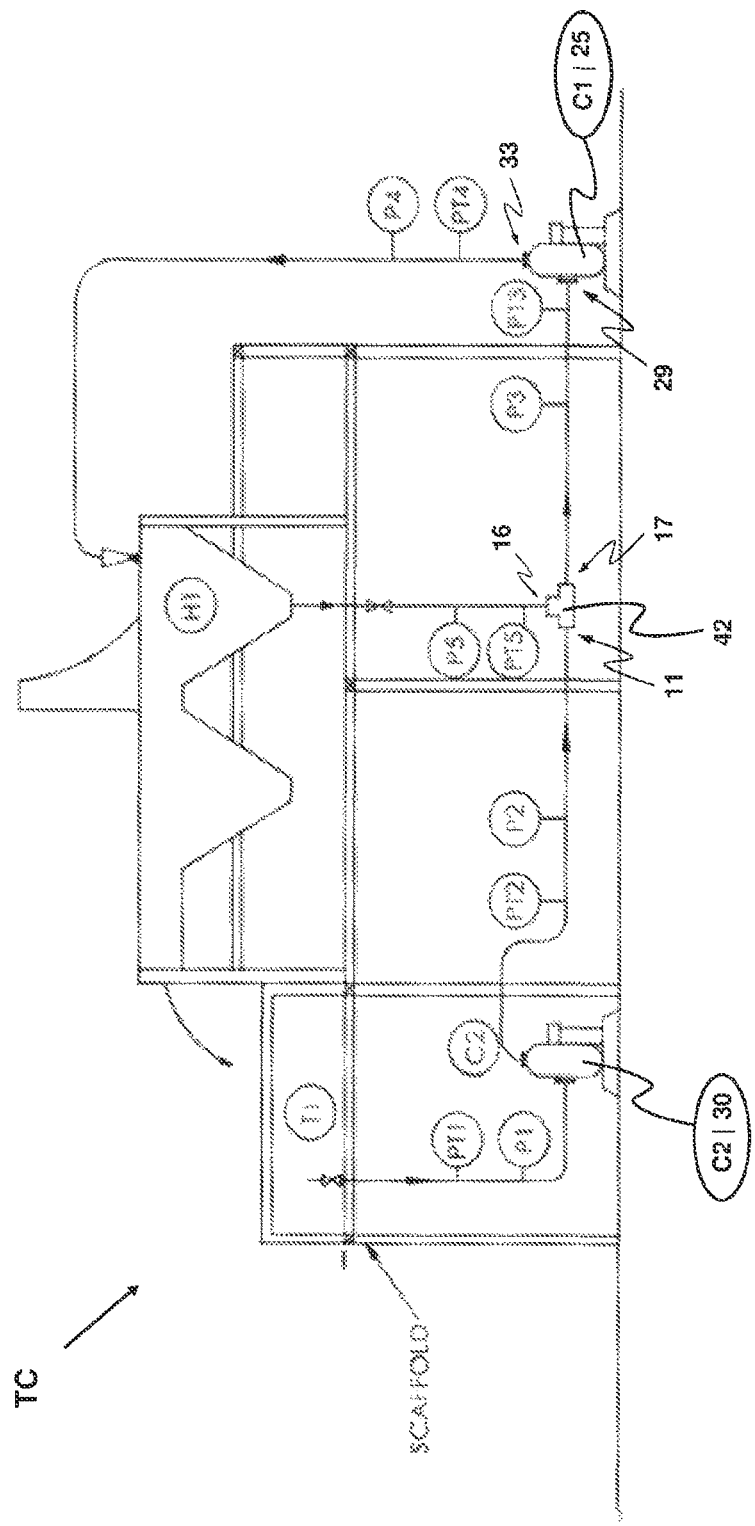
FIG. 9 shows a schematic view of an embodiment of a media handling system arranged in accordance with the principles described herein for testing purposes.
Figure 15:
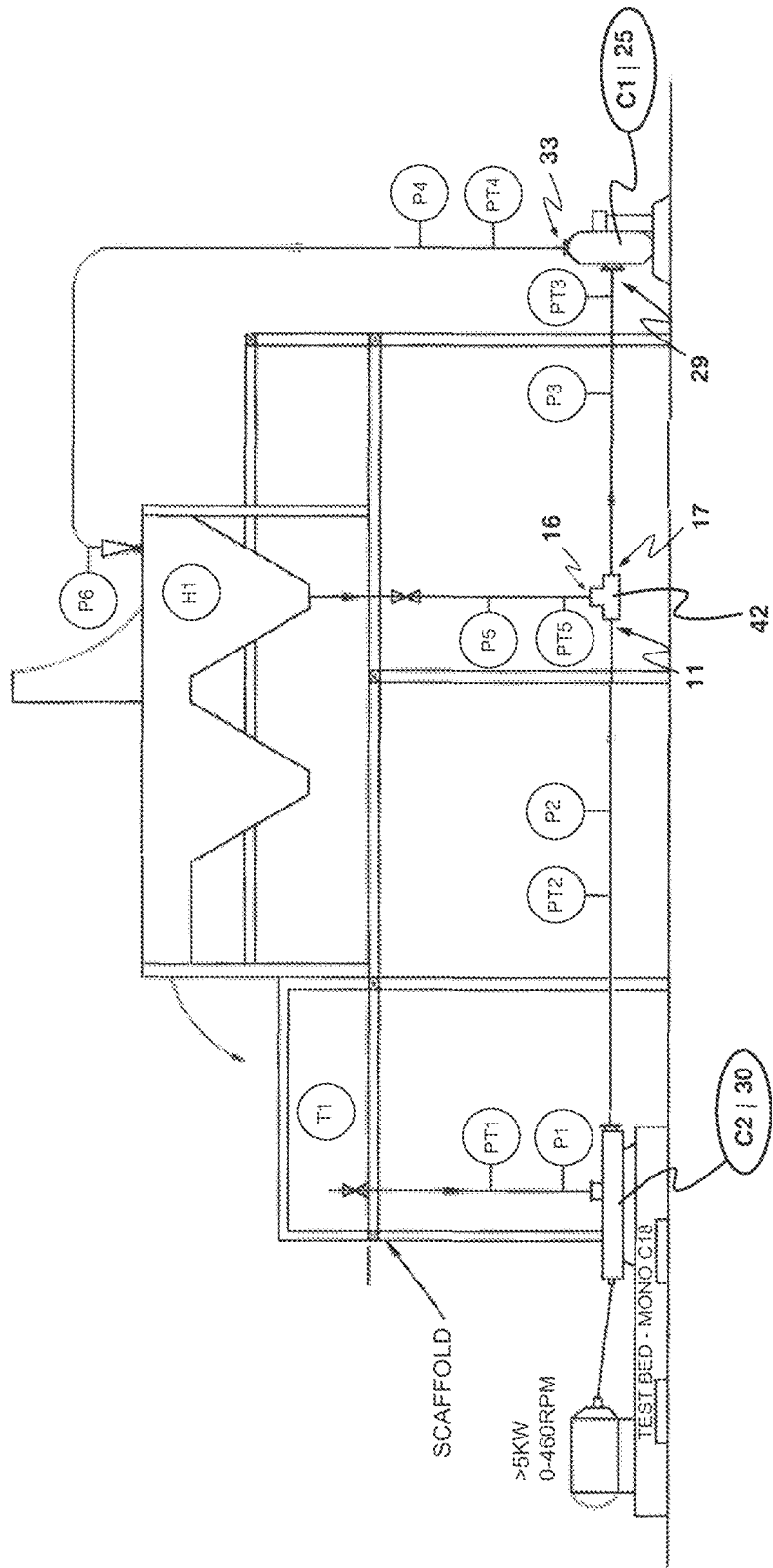
FIG. 15 shows a schematic view of a further embodiment of a media handling system arranged in accordance with the principles described herein.

A prototype configuration TC subjected to a testing exercise is shown in FIG. 9, the substance of which clearly resembles the elements shown in embodiment E2 of FIG. 8 (and broadly in FIG. 1). The tested configuration TC incorporates a form of an integration module 42 connected beneath a storage/collection hopper H1. The integration module 42 is fed by a pump which, for the first round of testing, comprised a centrifugal pump C2. It is contemplated that full scale commercial units could utilise a progressive cavity pump which can be configured to provide a metered reliable flow and head unaffected by other system parameters. Like with the embodiments described above, the tested configuration TC utilises a vortex pump C1. A further (preferred) test configuration is shown in FIG. 15 which is closely based on configuration TC.

The centrifugal pump C2 draws water from tank T1 (analogous to reservoir 55) through a length of a 3-inch PVC flexible suction hose P1, and delivers the water to an integration module 42 through a length of a 2-inch clear braided PVC flexible hose P2. The integration module 42 is positioned directly underneath the collection hopper H1 and connected to the hopper with a length of a 3-inch clear wire reinforced suction hose P5.

In operation, entrained media is discharged from the integration module 42 and delivered to the vortex pump C1 at a combined density in a range of from about 1.2 to about 1.3 specific gravity with a length of a 3-inch PVC suction hose P3. The vortex pump C1 then delivers the combined water 10 and grinding media 15 back into the collection hopper H1 via a length of a 2-inch clear braided PVC flexible hose P4.

The delivery pipe P4 is throttled on it's end (by way of a nozzle being fitted to its terminal end to throttle the flow to build back-pressure in the delivery pipeline) so as to simulate a static head associated with the elevated delivery height of the industrial unit (Mill). The nozzle size used in this testing exercise was about 20 mm in diameter.

The vortex pump C1 and the centrifugal pump C2 speeds are controlled by an inverter via a programmable logic controller (PLC) and graphic human-machine interface (HMI). This allows an operator to set the relevant pump speed as a percentage of full speed by changing the inverter frequency 0-60 hz. The speeds for each of the pumps C1 (vortex), C2 (centrifugal) were verified using a laser tachometer and extrapolated to calculate pump speed for all percentage setpoints in the following results table in Table 1 below.

TABLE 1

| Vortex pump (C1) | | | Centrifugal pump (C2) | | |
|---|---|---|---|---|---|
| Speed | % | rpm/% | Speed | % | rpm/% |
| 1346 | 50 | 26.92 | 406 | 15 | 27.07 |
| 621 | 25 | 24.84 | 411 | 20 | 20.55 |
| | Average | 25.88 | | Average | 23.81 |

Equipment

Pipe lengths used in the tested configuration TC are summarised as follows:

P1: 5 m 3-inch PVC flexible suction hose.
P2: 5 m 2-inch clear braided PVC flexible hose.
P3: 3.5 m 3-inch PVC flexible suction hose.
P4: 14 m 2-inch clear braided PVC flexible hose.
P5: 2.2 m 3-inch clear wire reinforced suction hose.

All 3-inch connections are made using quick connect Bauer couplings. The majority of the 2-inch connections were made with jubilee clamps. The exception to the latter was pipe length P2 which connected with the integration module 42 using a 'cam lock' coupling.

Pressure transducers were placed in the system to give real-time information on pump suction and delivery conditions, as well as hopper and nozzle pressure. The positions of each of the transducers are shown on the schematic of the testing embodiment presented in FIG. 9:

PT1: Inlet pressure: 0-6 Bar IFM Transducer Pt5414.
PT2: Centrifugal pump delivery: 0-16 Bar IFM Transducer Pt5414.
PT3: Vortex pump suction: 0-6 Bar IFM Transducer Pt5415.
PT4: Vortex pump delivery: 0-6 Bar IFM Transducer Pt5415.
PT5: Hopper delivery: −1-9 Bar WIKA Transducer 46879279.
PT6: Nozzle pressure: 0-6 Bar IFM Transducer Pt5415.

The following vortex C1 and centrifugal C2 pumps with the associated parameters were used in the testing exercise:

| Vortex pump (C1) | Centrifugal pump (C2) |
|---|---|
| Metso Outotec HM75 vortex pump. | Metso Outotec HM75 centrifugal pump. |
| Hard metal wet end components. | Hard metal wet end components. |
| 250 mm impeller diameter. | 250 mm impeller diameter. |
| 250 mm vane diameter. | 250 mm vane diameter. |
| 9 vanes. | 4 vanes. |
| Max sphere 30 mm. | 22 kw 8 pole motor. |
| 18.5 kw 2 pole motor. | Pulley diameters: 140/180. |
| Pulley diameters: 400/140. | |

As described above and shown in FIGS. 5 and 6, to achieve effective dilution and encourage the grinding media 15 toward the suction of the delivery pump 25 for prototype testing purposes, a custom integration module 42 was developed. Introduction of the dilution fluid 10 is made substantially tangentially with respect to the long radiused bend 23 at a shallow angle α so as to draw the grinding media 15 down from the upper inlet 16 and toward the outlet 17. For the configuration shown in FIGS. 5 and 6, a 300 mm length of 4-inch pipe extends after the bend before the outlet 17 and seeks to encourage steady flow conditions and reduce any turbulence that might be caused by the bend 23.

Respective inlets 11, 16 and outlet 17 ends of the integration module 42 were terminated with a Bauer type quick connect style coupling to aid easy reconfiguration for test/inspection purposes. The connection to the incoming dilution fluid from the centrifugal pump C2 was via a 1½ inch male BSP thread for fitting with a quick connect cam-lock fitting.

Testing Methodologies

The following broad method was used in the testing exercise:
- System primed with dilution water (10).
- Vortex pump C1 and centrifugal pump C2 started.
- Grinding media (15) introduced into hopper H1.
- Grinding media (15) allowed to circulate through the system to establish steady flow conditions.
- Pressures, motor speeds, power, and amps recorded.
- Grinding media (15) inlet flow rate measured using hopper H1 overflow and application of the principles of a V notch weir arrangement so as to, by deduction, allow for relatively accurate measurement of the desired or target flow rate (generally, the grinding media inlet flow rate is the difference between the total fluid flow and the flow over the V notch weir).
- Delivery nozzle diverted into collection container and collection time measure using stopwatch.
- Combined dilution water (10) and grinding media (15) collected and weighed.
- Dilution water (10) drained from sample and media weighed.
- Collected mass figure divided by time to give flow rate in kg/s.

Testing Outcomes

Testing comprised about 44 individual tests with the vortex pump C1 and centrifugal pumps C2 operating within ranges of about 1294 to about 207 rpm, and about 286 to about 952 rpm respectively. These tests gave varying delivery rates and saturations of about 3.4 to about 14.8 t/hr at about 13.3 to about 49.3% media by mass.

Effect of Vortex Pump on Flow/Velocity

Figure 10:
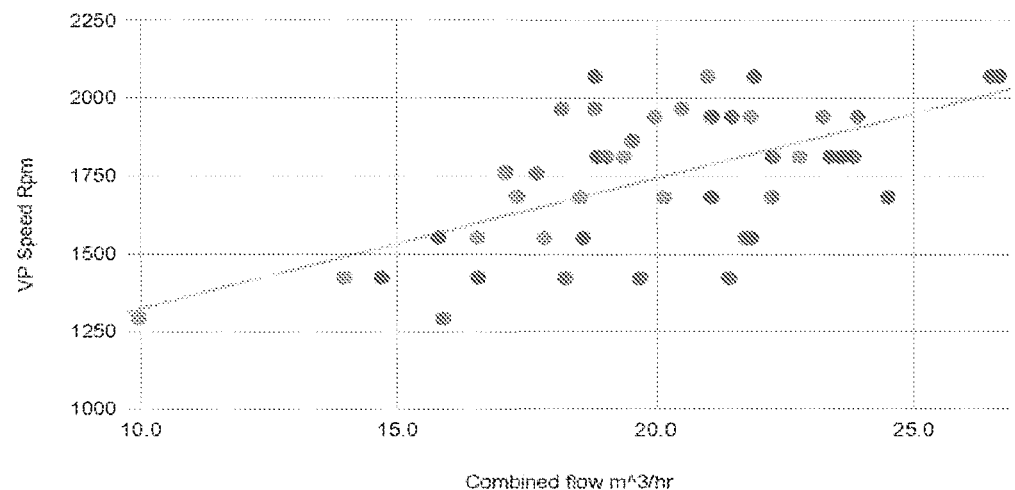
FIG. 10 shows a graph of vortex pump speed rpm vs combined flow/velocity for the embodiment shown in FIG. 9.

FIG. 10 shows a graph of vortex pump C1 speed (rpm) versus combined flow (m³/hr). The vortex pump C1 is the primary controller of delivery flow (of combined media). The graph shown in FIG. 10 shows a clear relationship between the vortex pump C1 speed (rpm) and combined (liquid water+media) flow. The error margin either side of the trendline can be explained by the variation of the centrifugal pump C2 (combined flow W2=dilution water W1+media drawn from hopper M+water drawn from hopper W).

Relationship Between Combined Specific Gravity and Dilution Water

Figure 11:
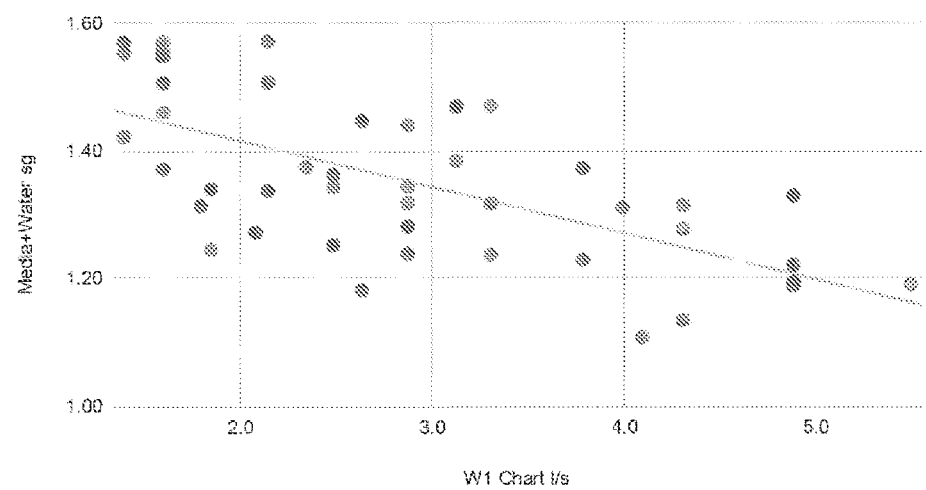
FIG. 11 shows a graph of testing data for the embodiment shown in FIG. 9.

A demonstrable relationship between the input from the centrifugal pump C2 and the specific gravity is evident from the relationship shown in FIG. 11. The notable amount of scatter astride the trend line is explainable given the varied vortex pump C1 speed (rpm), which also appears to affect the mix ratio in the integration module 42. The dilution fluid 10 flow rates measured from the V-notch methodology are taken from the text: Instrumentation handbook water and wastewater treatment plants, by Robert G Skrentner (with a stated accuracy of ±2-5%).

Figure 12:
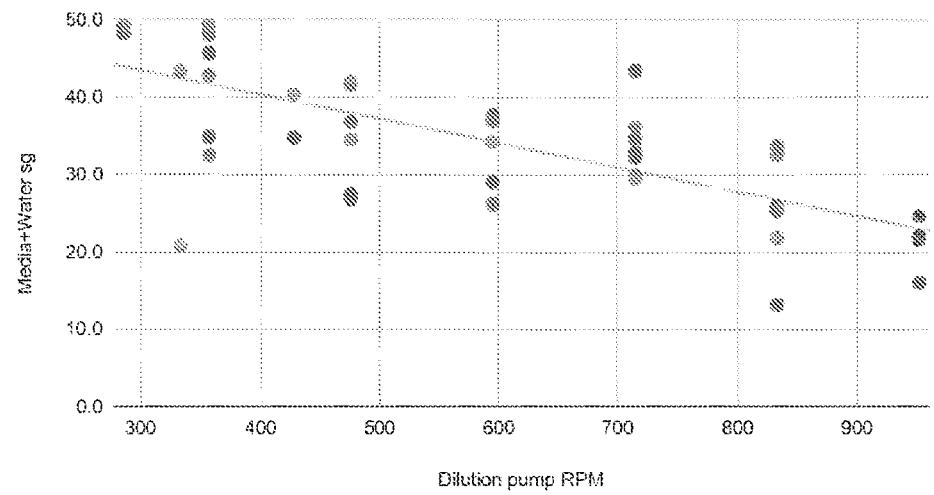
FIG. 12 shows a further graph of testing data for the embodiment shown in FIG. 9.

As also expected, a close correlation with the centrifugal pump C2 speed (rpm) is shown in FIG. 12.

Effect of Specific Gravity on Media Delivery Rate

Figure 13:
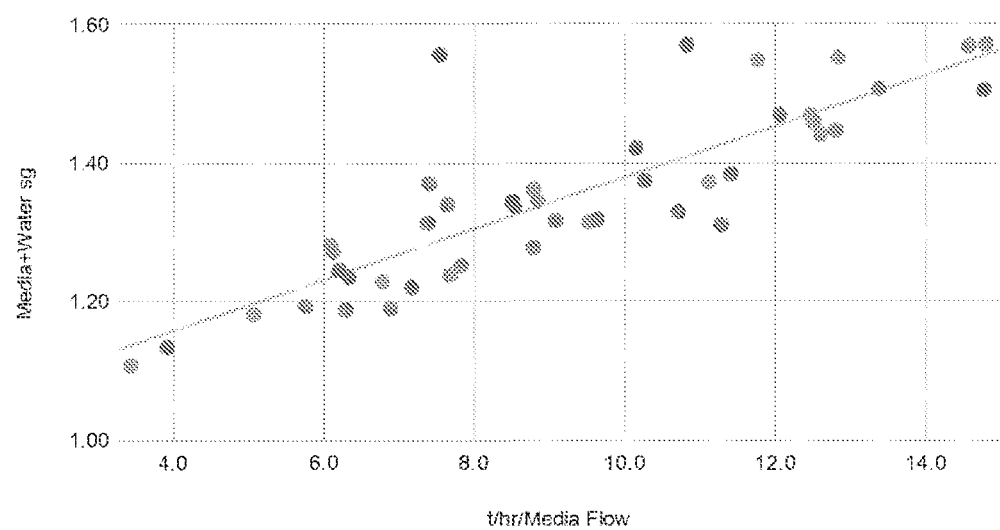
FIG. 13 shows another graph of testing data for the embodiment shown in FIG. 9.
Figure 14:
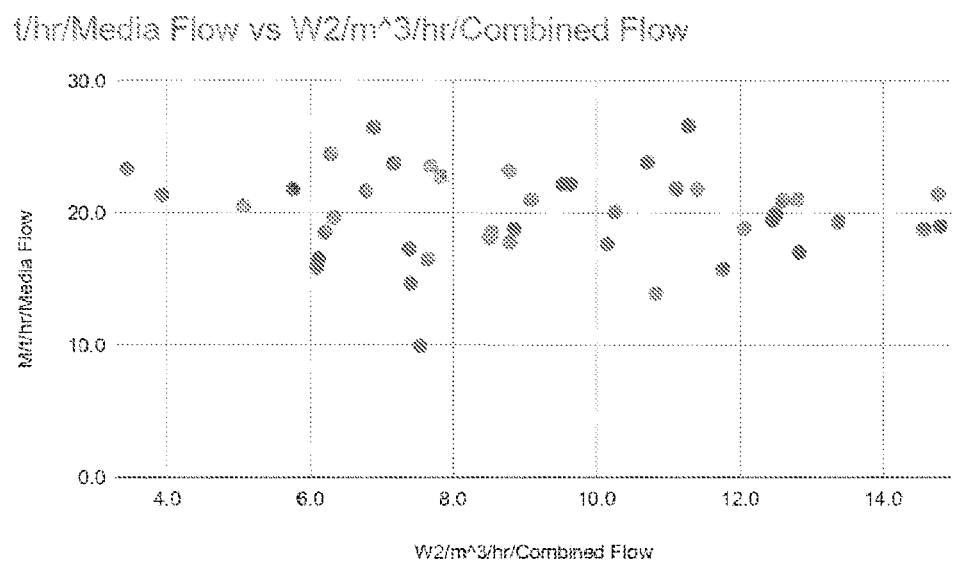
FIG. 14 shows a graph of t/hr/Media flow versus W2/m³/hr/combined flow data relevant for the embodiment shown in FIG. 9.

The combined specific gravity of the grinding media 15 and the dilution fluid 10 shows a very strong correlation, as shown in FIGS. 13 and 14. As the media delivery rate is a function of combined specific gravity and combined delivery rate (using the calculation for the specific gravity of a slurry below) the result shown is somewhat expected, although when compared to combined flow vs media flow plots suggests that specific gravity is a material factor in the entrained media delivery rate.

S=specific gravity of slurry
Si=specific gravity of liquid phase
Ss=specific gravity of solids phase
Ow=concentration of solids by weight
Cv=concentration of solids by volume EXAMPLE: if the liquid has a specific gravity of 1.2 and the concentration of solids by weight is 36% the solids having a specific gravity of 2.2 then:

$$S = \frac{S_s \times S_1}{S_s + C_w(S_1 - S_s)}$$

$$S = \frac{2.2 \times 1.2}{2.2 + .35(1.2 - 2.2)} = 1.43$$

Using the determined viscosity of the fluid, the density of the grinding media particles, and the density or specific gravity of the entrained media, Stokes' Law calculations can be used to calculate the target flow velocity. Pipe flow velocities of about 2 m/s and greater have been determined to be required to effectively transport media up to about 6 mm 6 sg.

Further Testing

In one application, the principles of the system 5 described herein may be used to deliver the grinding media to a height of about 20-25 m to ensure delivery back into the tallest HIG grinding mills allowing some overhead space to pump into holding hoppers or onto a sieve bend screen for dewatering.

Figure 16:
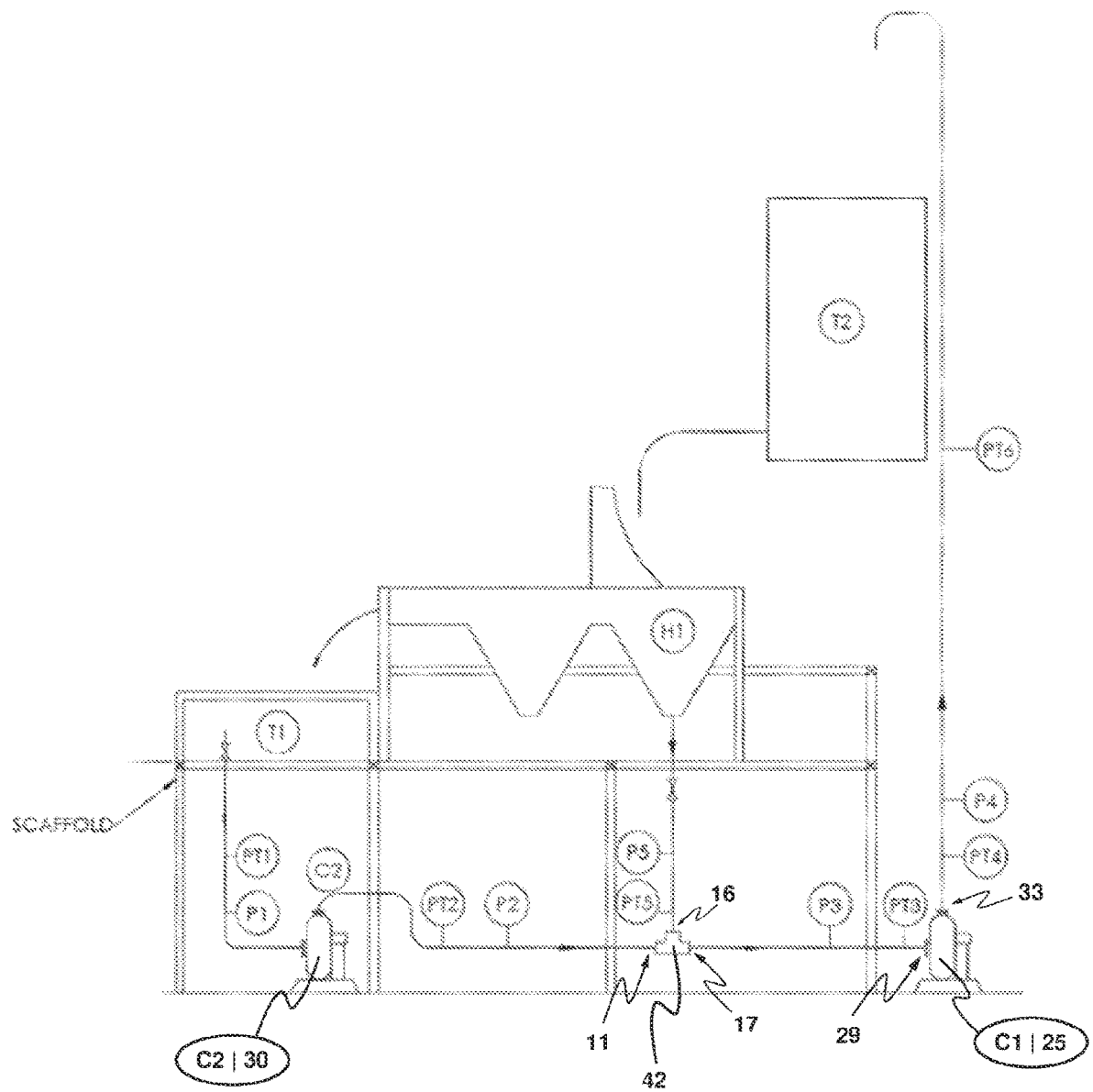
FIG. 16 shows a schematic view of a further embodiment of a media handling system arranged in accordance with the principles described herein (incorporating an extended elevated delivery point)

Further testing was carried out using another test rig shown in FIG. 16, whereby the delivery nozzle was removed and the delivery point was elevated to about 17.5 m above ground level and the entrained flow outputting to a boil box T2. This was done predominantly for the purposes of visual demonstration, but a series of tests were performed using parameters which yielded conditions of flow involving velocities of about 2.5 m/s at a specific gravity (of the entrained media) of about 1.25 (~1,250 kg/m³) which, when calculated to a full-scale system with about a 90 mm delivery pipe, is believed could produce a flow rate of approximately 19 t/hr.

Observations from Testing Exercise

The following brief observations can be made based on the prototype testing exercise undertaken to date:
- A clear correlation between combined density and centrifugal pump C2 flow rate suggests that combined specific gravity is relatively controllable using dilution water 10.

A strong correlation between combined density and t/hr media delivery rates suggests that combined density is a material controlling factor on delivery rates.

Testing demonstrated that a combined specific gravity of the entrained media up to about 1.57 is achievable with test configuration used.

A combined specific gravity of about a maximum of 1.3 is desirable to prolong life of pipework etc.

A stable flow at fixed pump speeds was inferred from the test data.

The vortex pump C1 used demonstrated capability of producing delivery heads sufficient to deliver combined water (10) and grinding media (15) to about 20 m.

No evidence of media damage was observed for 3 mm 3.8 sg media.

Media delivery rates of about 14.8 t/hr were achievable with the testing configuration TC used.

Media delivery rates determined by combined density (grinding media 15+water 10) and volumetric flow, which are controlled by the vortex C1 and centrifugal C2 pumps, the vortex pump C1 being the prime influencer of flow and the centrifugal pump C2 influencing the dilution. As the flow is varied using the vortex pump C1, such variance affects the dilution also. Similarly, the centrifugal pump C2 has a lesser effect on the flow.

Power draw from the vortex pump C1 gives an indication of the combined density of the entrained media being pumped.

Portable/Transportable Module

Broadly, in another aspect, the principles of the system 5 as described herein may be configured so as to provide an embodiment that can be mobile/transportable, for example, to/from desired site location(s) as required, and fluidly connected with grinding mill equipment located on site as needed. In this manner, a single portable media handling system can be provided as a module or unit for use with grinding mill equipment across different sites, or for use with different grinding mill equipment installed at different positions across a single general site location. FIGS. 17 to 20 show one such embodiment 5'. Reference numerals used in the explanation of the embodiments described above involving shared/analogous features is retained for the description of the embodiment 5' below.

Figure 17:
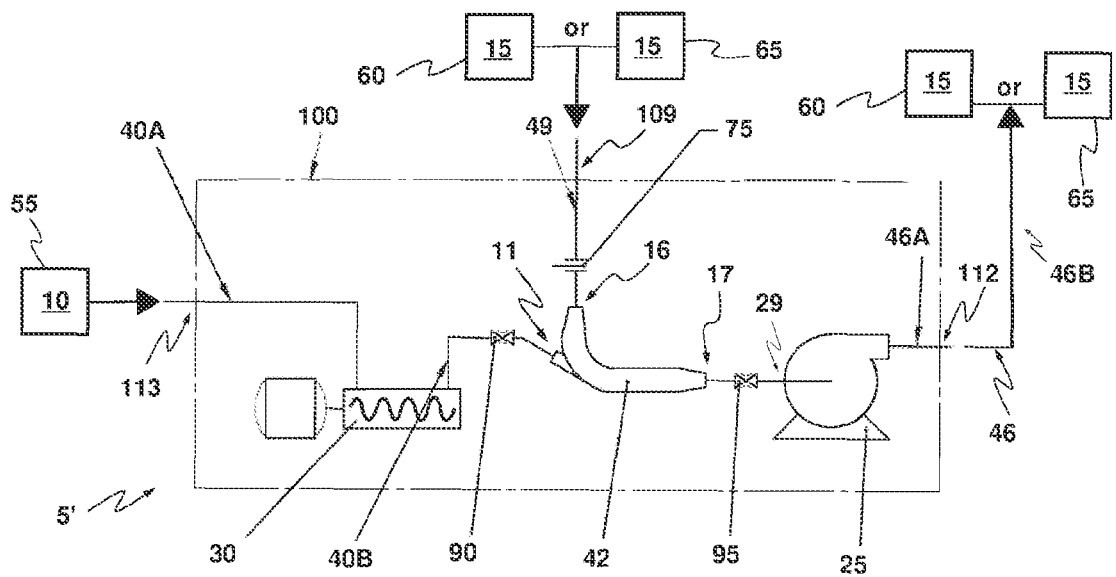
FIG. 17 shows a schematic elevation view of a further embodiment of a media handling system arranged in accordance with the principles described herein, in which the media handling system is configured as a mobile module or unit so as to be portable/transportable to/from remote/different locations/sites.

FIG. 17 shows a schematic view of the embodiment of a transportable media handling system 5' (hereinafter, system 5') using the principles described herein, in which the features of the flow pathway 20, the dilution pump 30, the integration module 42, and the delivery pump 25 are configured with a frame assembly 100. Of course, consistent with the arrangement shown in FIGS. 2 and 3, valves V2 (electrically activated knife gate valve—reference 75 in FIGS. 18 to 20), V3 (pinch/ball valve or a 2 way solenoid ACT ball valve—reference 90 in FIGS. 18 to 20), and V4 (pinch valve—reference 95 in FIGS. 18 to 20) and the connecting conduits/pipe segments are also retained with the system 5'.

Figure 18:
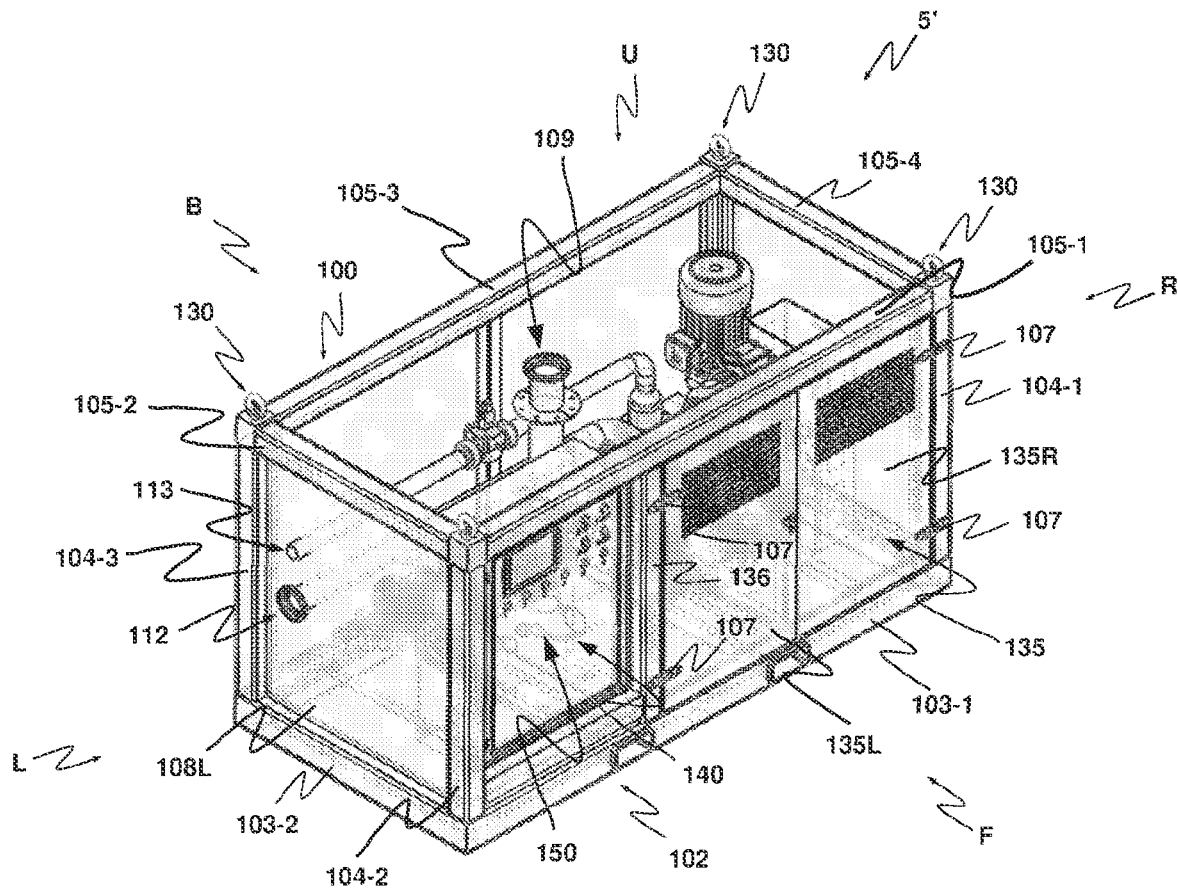
FIG. 18 shows a perspective view of the embodiment shown in FIG. 17.
Figure 19:
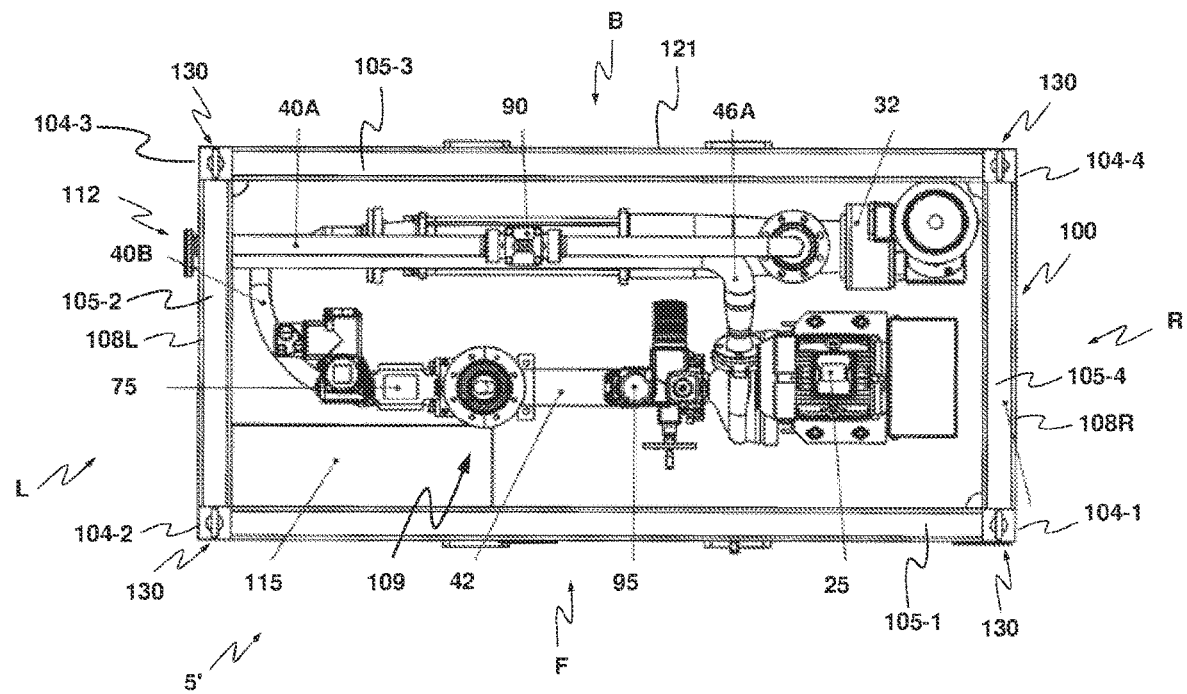
FIG. 19 shows an elevation view with side structure removed showing the internal components of the embodiment shown in FIG. 17.
Figure 20:
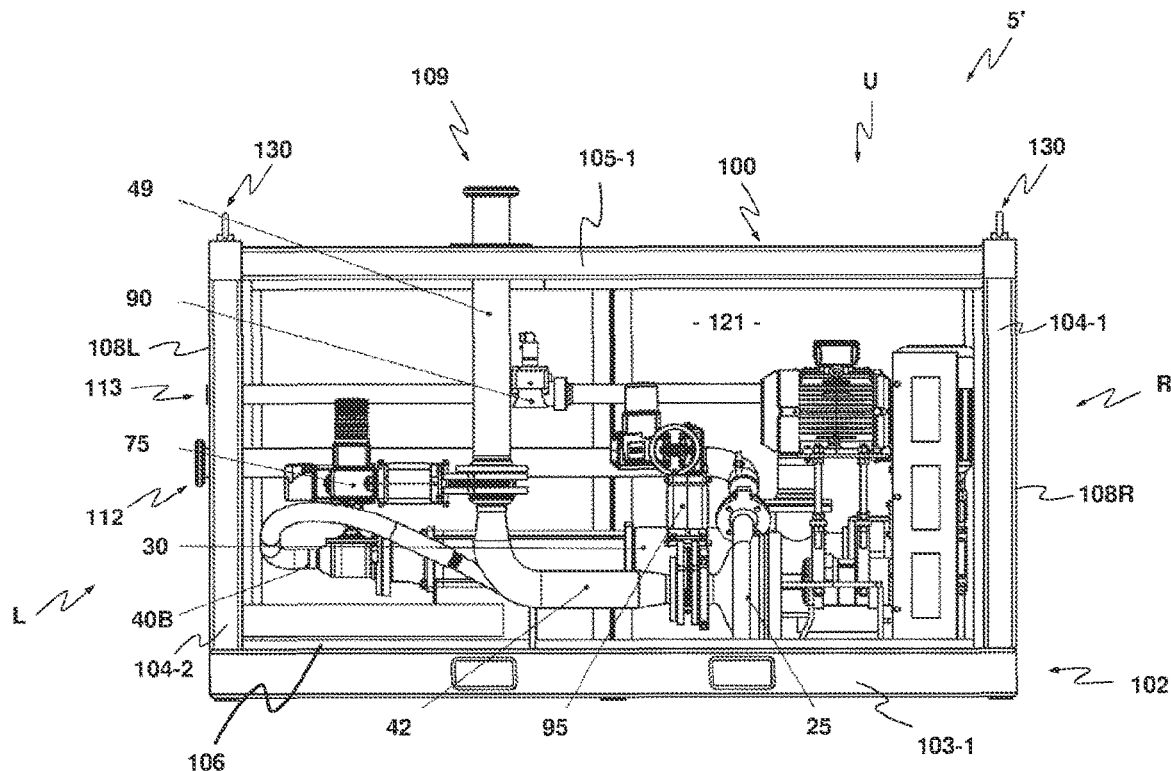
FIG. 20 shows a plan view showing the internal components of the embodiment shown in FIG. 17.

As better seen in FIGS. 18 to 20, the frame assembly 100 comprises a base structure 102 defined by four beam elements 103-*n* (103-1 and 103-2 shown in FIG. 18 but beam elements 103-3 and 103-4 are not visible in the figures) arranged to define a rectangular form of the base structure 102. A support panel 106 positions atop the base structure 102 providing support to the componentry of the system 5', as best shown (in elevation view) in FIG. 20. Four vertically arranged beam elements 104-1, 104-2, 104-3, 104-4 of equal length extend upwards at respective corners of the base structure 102 and join with respective beam elements 105-*n*. In this manner, a rectangular box frame is defined (which defines an envelope within which the componentry of the system 5' is supported/fixed in position) having a rear side assembly B (defined by vertical beam elements 104-3, 104-4 connected with beam elements 103-3, 105-3), a front side assembly F (defined by vertical beam elements 104-1, 104-2 connected with beam elements 103-1, 105-1), a right hand end assembly R (defined by vertical beam elements 104-1, 104-4 connected with beam elements 103-4, 105-4), and a left hand end assembly L (defined by vertical beam elements 104-2, 104-3 connected with beam elements 103-2, 105-2).

The rear side assembly B of the frame assembly 100 supports a rear panel 121, the right-hand end assembly R supports an end panel 108R, and the left-hand end assembly L supports an end panel 108L. The front side assembly F supports a door assembly 135 comprising door panels 135R/L which are hingedly associated with the corner vertical beam element 104-1 and a vertical beam element 136 respectively so as to open when swinging away from each other using hinges 107 thereby allowing access to the componentry housed within. The front side F further supports an electrical box 140 which provides a housing for various electrical components (eg. Control electronics/circuitry, PLC module(s), etc), including an interface module 150 allowing an operator to operate the embodiment 5'.

Of course, each of the beam elements 103, 105, the vertical beam elements, and the support panel 106, are formed having sufficient structural capacity so that the frame assembly 100 is sufficiently strong/capable of supporting the componentry housed within the frame assembly 100. It will be noted that each of the corners of the frame assembly 100 are provided with respective pad-eyes or lifting lugs/eyelets 130 so that the frame assembly 100 can be lifted and positioned as required using appropriate lifting equipment/apparatus, such as for example, to/from a transport to a desired or target position for operational use. Materials for the beam elements could comprise different types of steel having suitable structural capacity/strength and/or corrosion resistant properties (eg. Stainless steel of grades 306/316) given the generally hostile environments the system 5' will be intended to operate in. The panels used to clad the frame assembly 100 may also be of any material having suitable structural and/or corrosion resistance such as, for example, stainless steels of 306, 316 grade.

As will be seen in FIGS. 17 to 20, the system 5' comprises an inlet 113 which is configured so as to be proud of the end panel 108L of the left-hand end assembly L of the frame assembly 100 so as to be fluidly connectable with a liquid media supply (eg. a storage vessel 55) so that the dilution fluid 10 can be introduced into the integration module 42 via a conduit or pipe segment 40A by operation of the dilution pump 30.

The system 5' further comprises an inlet 109 which is configured so as to be proud of the upper most side U (which may also comprise a panel assembly so as to enclose all componentry of the system 5') of the frame assembly 100 so as to be fluidly connectable with a suitable supply (eg. a storage vessel 60/65) of grinding media 15 and from which the grinding media can be introduced into the integration module 42 via a conduit or pipe segment 49.

The system 5' further comprises an outlet 112 fluidly connected with and downstream of the delivery pump 25 (via a conduit section 46A), and which is configured so as to be proud of the panel 108L of the left-hand end assembly L of the frame assembly 100 so as to be fluidly connectable with a flow pathway section 46 (defined by an appropriate pipe or conduit network 46B) that fluidly connects the outlet 112 with the target delivery destination (whether it is a grinding mill or a grinding media storage vessel). The inlets 113, 109 and outlet 112 may comprise any suitable form of couplings/connector (eg. quick release Bauer or Chicago type couplings) capable of establishing a fluid connection with relevant connecting pipes/conduits (of the reservoir 55, the grinding mill/grinding media holding vessel 65/60, flow pathway 46).

Accordingly, it will be seen that the mobile module embodiment 5' of the system 5 represents a convenient arrangement (being portable, transportable to/from different site locations for use with different grinding mill equipment and/or grinding mill storage facilities/vessels) that draws on the principles shared by each of the embodiments of the system 5 described above.

Modifications and variations may be made to the principles described herein within the context of that described herein and shown in the drawings. Such modifications are intended to form part of the inventive concept described in this specification.

It will be appreciated that future patent applications maybe filed in Australia or overseas on the basis of, or claiming priority from, the present application.

It is to be understood that the following claims are provided by way of example only and are not intended to limit the scope of what may be claimed in any application relating to the present application. Features may be added to or omitted from the following claims at a later date so as to further define or re-define the invention or inventions.

The invention claimed is:

1. A media handling system for mixing and or entraining grinding media with a liquid media for supply to a selected destination, the media handling system comprising:
   a first media pumping means or module configured operable for providing a flow of liquid media having a respective flow condition to a first inlet by way of which liquid media is received by the media handling system,
   a second media pumping means or module arranged in fluid communication with and downstream of both of the first inlet and a second inlet by way of which grinding media is received by the media handling system, and configured operable for supplying to the selected destination a mixed flow of liquid received via at least the first inlet and grinding media having a respective flow condition,
   wherein, in use, one or both of the first and second media pumping means or modules are operated relative to the other so that the flow condition generated by the first media pumping means or module is insufficient to meet a flow requirement or demand of the second media pumping means or module thereby enabling both of the respective flow conditions to cooperate to develop a region of differential pressure between the second inlet and the second media pumping means or module which, when developed, draws or urges a flow of the grinding media into the media handling system via the second inlet for controllably modifying a concentration of grinding media in the mixed flow of liquid and grinding media so as to converge toward and or substantially maintain a target concentration of grinding media determined to be suitable for enabling supply of the mixed flow of liquid and grinding media to the selected destination by the second media pumping means or module.

2. A media handling system for mixing and or entraining grinding media with a liquid media for supply to a selected destination, the media handling system comprising:
   a first media pumping means or module configured operable for providing a flow of liquid media having a respective flow condition to a first inlet by way of which liquid media is receivable by the media handling system,
   a second media pumping means or module arranged in fluid communication with and downstream of both of the first inlet and a second inlet by way of which grinding media is receivable by the media handling system, and configured operable for supplying to the selected destination a mixed flow of liquid received via at least the first inlet and grinding media having a respective flow condition,
   wherein, in use, one or both of the first and second media pumping means or modules are operated having regard to, or in relation to, the operation of the other so that the flow condition generated by the first media pumping means or module is insufficient to meet a flow requirement or demand of the second media pumping means or module thereby enabling both of the respective flow conditions to cooperate to develop a region of differential pressure between the second inlet and the second media pumping means or module which, when developed, draws or urges a flow of the grinding media into the media handling system via the second inlet for controllably modifying a concentration of grinding media in the mixed flow of liquid and grinding media so as to converge toward and or substantially maintain a target concentration of grinding media determined to be suitable for enabling the generation and or maintenance of a flow velocity of the mixed flow determined to be required to overcome a head characteristic of the media handling system imposed by the selected destination for enabling supply of the mixed flow by the second media pumping means or module.

3. A media handling system according to claim 1, wherein, in use, the first media pumping means or module is operated so that the respective flow condition it generates for introducing the flow of liquid media to the first inlet is insufficient to meet the flow requirements or demands required of the second media pumping means or module for operating at a target level of operation determined to be suitable for supplying the mixed flow to the selected destination thereby facilitating, at least in part, the drawing or urging of a flow of the grinding media having a respective flow condition into or through the second inlet for engagement with the flow of the liquid media for mixing and or entrainment purposes.

4. A media handling system according to claim 1, wherein, in use, one or both first, second media pumping means or modules are operated so that the respective flow conditions each generate are operable or cooperable with the other for facilitating mixing and or entraining of the flows of the liquid media and the grinding media so as to achieve and or substantially maintain a desired or target density or specific gravity of the flow condition of the mixed flow of liquid and grinding media suitable for facilitating conveyance or delivery of the grinding media to or toward the delivery destination at a target delivery velocity.

5. A media handling system according to claim 1, wherein the system is configured so that, in use, control or regulation of a density or specific gravity of the flow condition of the mixed flow of liquid and grinding media is achieved by, at least in part, selective operation of the first media pumping means or module for varying the quantity of the liquid media introduced through the first inlet for engagement with the flow of the grinding media.

6. A media handling system according to claim 1, wherein the system is configured so that, in use, operation of one or both of the first, second media pumping means or modules is managed or caused to be managed so that a pressure of the flow condition of the liquid media discharged from the first media pumping means or module at or near where it enters the first inlet is or is caused to be generated, controlled or regulated, and or substantially maintained so as to generate and or substantially maintain a pressure differential relative to a pressure of a flow condition of the grinding media at or near where it enters the second inlet.

7. A media handling system according to claim 3, wherein the system is configured so that, in use, operation of one or both of the first, second media pumping means or modules is managed or caused to be managed so that a pressure of the flow condition of the liquid media discharged from the first media pumping means or module for entry into the first inlet is caused to be generated, controlled or regulated, and or substantially maintained so as to generate and or substantially maintain a pressure that is less than a pressure of the flow condition of the grinding media at or near where it enters the second inlet.

8. A media handling system according to claim 1, wherein the system is configured so that, in use, operation of one or both of the first, second media pumping means or modules is managed or caused to be managed so that a pressure of the flow condition of the liquid media discharged from the first media pumping means or module and a pressure of the flow condition of the mixed flow of liquid and grinding media discharged from the second media pumping means or module are caused to be controlled and or regulated so that a substantially negative relationship is generated, controlled or regulated, and or substantially maintained between the respective pressures of respective flow conditions of the flow of mixed liquid and grinding media entering and discharged from the second media pumping means or module, said negative relationship involving the pressure of the flow condition of the mixed flow of liquid and grinding media entering the second media pumping means or module being less than the pressure of the flow condition of the mixed flow of liquid and grinding media discharged from the second media pumping means or module.

9. A media handling system according to claim 1, wherein the system is configured so that, in use, one or both of the first and second media pumping means or modules are operated or caused to be operated for generating, controlling or regulating, and or maintaining a pressure of the flow condition of the mixed flow of liquid and grinding media discharged from the second media pumping means or module so as to be greater than any pressure caused due to a determined relevant duty system head and/or friction head loss characteristics for a relevant duty application.

10. A media handling system according to claim 1, wherein the system is configured so that, in use, one or both of the first and second media pumping means or modules are operated or caused to be operated for generating, controlling or regulating, and or substantially maintaining a volumetric flow rate of the flow condition of the mixed flow of liquid and grinding media discharged from the second media pumping means or module that is sufficient for enabling a velocity of the flow condition of the mixed flow of liquid and grinding media to be from about 2 to about 3 metres per second notwithstanding losses caused due to a determined relevant system head and/or friction characteristics for a relevant duty application.

11. A media handling system according to claim 1, wherein the second media pumping means or module is configured so as to be, in use of the system, operated or caused to be operated so that one or more flow attributes of the flow condition of the mixed flow of liquid and grinding media discharged from the second media pumping means or module is variable as might be needed in response to variations to any flow attribute(s) of the flow condition of the liquid media discharged from the first media pumping means or module in order to substantially generate, control or regulate, and or maintain a differential between a pressure of the flow condition of the mixed flow of liquid and grinding media at or near the inlet of the second media pumping means or module and a pressure of the flow condition of the mixed flow of liquid and grinding media discharged from the second media pumping means or module that facilitates or enables drawing or urging of the flow of the grinding media through the second inlet.

12. A media handling system according to claim 11, wherein the differential between the pressure of the flow condition of the mixed flow of liquid and grinding media at or near the inlet of the second media pumping means or module and the pressure of the flow condition of the mixed flow of liquid and grinding media discharged from the second media pumping means or module that facilitates or enables drawing or urging of the flow of the grinding media through the second inlet is negative in that the pressure of the flow condition of the mixed flow of liquid and grinding media entering the second media pumping means or module is less than the pressure of the flow condition of the mixed flow of liquid and grinding media exiting or discharged therefrom.

13. A media handling system according to claim 1, wherein the system is configured so that, in use, based at least in part on the monitoring or determination of one or more flow attributes of the flow condition of the grinding media entering the second inlet in order to derive or determine its density or specific gravity, operation of one or both of the first, second media pumping means or modules is managed or caused to be managed so that a ratio of one or both of a mass flow rate and a volumetric flow rate of a or the flow condition of the grinding media at or near where it enters the second inlet with respect to a mass flow rate and a volumetric flow rate respectively of the flow condition of the liquid media at or near where it enters the first inlet, is or is caused to be generated, controlled or regulated and or substantially maintained for drawing or urging of the flow of the grinding media through the second inlet for generating, controlling or regulating, and or substantially maintaining a density or specific gravity of the flow condition of the mixed flow of liquid and grinding media to be from about 1.1 to about 1.6.

14. A media handling system according to claim 13, wherein the ratio of the mass flow rate of the flow condition of the grinding media entering the second inlet with respect to the mass flow rate of the flow condition of the liquid media entering the first inlet is from about 0.2 to about 1.6, and the ratio of the volumetric flow rate of the flow condition of the grinding media entering the second inlet with respect to the volumetric flow rate of the flow condition of the liquid media entering the first inlet is less than unity.

15. A media handling system according to claim 1, wherein, in use, the second media pumping means or module is operated at an operational state determined to be suitable for supplying the mixed flow of liquid and grinding media to the selected destination, and the first media pumping means or module is configured so that its operational state is controllable relative or in relation to, or having regard to, the operational state of the second media pumping means or module for controllably modifying the concentration of grinding media in the mixed flow of liquid and grinding media so as to converge toward and or substantially maintain the target concentration of grinding media.

16. A media handling system according to claim 1, wherein the second media pumping means or module is arranged in fluid communication with one or more flow pathways or fluid circuits that fluidly connect the second media pumping means or module with the selected destination, which may be elevated above the reception of the liquid media and or the grinding media at the respective first, second inlets.

17. A media handling system according to claim 1, wherein the first and second inlets are defined or provided by way of a junction module fluidly connected between the first media pumping means or module and the second media pumping means or module, the junction module defining or providing (i) the first inlet arranged for receiving the flow of the liquid media, (ii) the second inlet arranged for receiving the flow of the grinding media, and (iii) an outlet toward which flows of both media moves for discharge from the junction module toward the second media pumping means or module as a substantially mixed and or entrained flow.

18. A media handling system according to claim 1, wherein the first media pumping means or module comprises one of the following: a pressure pump, a centrifugal pump, a peristaltic pump, a progressive cavity pump, a rotary lobe pump, a diaphragm pump, a piston pump, a screw pump, and the second media pumping means or module comprises any one of the following: a vortex pump, a centrifugal pump, a peristaltic pump.

19. A media handling system according to claim 1, the target concentration or density of grinding media determined to be suitable for enabling supply of the mixed flow of liquid and grinding media to the selected destination by the second media pumping means or module is in a range from about 1.1 to about 1.6 specific gravity.

20. A media handling system according to claim 1, wherein the media handling system is configured so as to be supported on a moveable structure or platform so as to be portable or transportable.

21. A method for mixing and or entraining grinding media with a liquid media for supply to a selected destination by way of a fluid circuit, the method comprising:
configuring a first media pumping means or module so as to be operable for providing a flow of liquid media having a respective flow condition to a first inlet by way of which liquid media is receivable by the fluid circuit,
configuring a second media pumping means or module so as to be arranged in fluid communication with and downstream of both of the first inlet and a second inlet by way of which grinding media is receivable by the fluid circuit, and to be operable for supplying to the selected destination a mixed flow of liquid receivable via at least the first inlet and grinding media having a respective flow condition,
configuring and or operating, and or causing to be operated, one or both of the first and second media pumping means or modules so that one or both are operable relative to the other so that the flow condition generated by the first media pumping means or module is insufficient to meet a flow requirement or demand of the second media pumping means or module thereby enabling both of the respective flow conditions to cooperate to develop a region of differential pressure between the second inlet and the second media pumping means or module which, when developed, draws or urges a flow of the grinding media into a media handling system via the second inlet for controllably modifying a concentration of grinding media in the mixed flow of liquid and grinding media so as to converge toward and or substantially maintain a target concentration of grinding media determined to be suitable for enabling supply of the mixed flow of liquid and grinding media to the selected destination by the second media pumping means or module.

22. A method for mixing and or entraining grinding media with a liquid media for supply to a selected destination by way of a fluid circuit, the method comprising:
configuring a first media pumping means or module so as to be operable for providing a flow of liquid media having a respective flow condition to a first inlet by way of which liquid media is receivable by a media handling system,
configuring a second media pumping means or module so as to be arranged in fluid communication with and downstream of both of the first inlet and a second inlet by way of which grinding media is receivable by the fluid circuit, and to be operable for supplying to the selected destination a mixed flow of liquid receivable via at least the first inlet and grinding media having a respective flow condition,
configuring and or operating, and or causing to be operated, one or both of the first and second media pumping means or modules so that one or both are operable having regard to, or in relation to, the operation of the other so that the flow condition generated by the first media pumping means or module is insufficient to meet a flow requirement or demand of the second media pumping means or module thereby enabling both of the respective flow conditions to cooperate to develop a region of differential pressure between the second inlet and the second media pumping means or module which, when developed, draws or urges a flow of the grinding media into the media handling system via the second inlet for controllably modifying a concentration of grinding media in the mixed flow of liquid and grinding media so as to converge toward and or substantially maintain a target concentration of grinding media determined to be suitable for enabling the generation and or maintenance of a flow velocity of the mixed flow determined to be required to overcome a head characteristic of the media handling system imposed by the selected destination for enabling supply of the mixed flow of liquid and grinding media by the second media pumping means or module.

23. A method for mixing and or entraining grinding media with a liquid media for supply to a selected destination, the method comprising:
providing, supplying, or configuring for use any embodiment of a media handling system arranged in accordance with claim 1, and or
providing or supplying a quantity of liquid media for receipt by way of the first inlet of said embodiment, and or
providing or supplying a quantity of grinding media for receipt by way of the second inlet of said embodiment, and or operating, or causing to be operated, said embodiment for supplying a portion of the grinding media to the selected destination.

\* \* \* \* \*